United States Patent
Nauckhoff

[11] Patent Number: 5,893,128
[45] Date of Patent: Apr. 6, 1999

[54] DISTRIBUTED WORK FLOW MANAGEMENT

[76] Inventor: Sven Nauckhoff, Sibyllegatan 43-45, Stockholm, Sweden, S-144 42

[21] Appl. No.: 530,270

[22] PCT Filed: Mar. 1, 1994

[86] PCT No.: PCT/SE94/00173

§ 371 Date: Dec. 5, 1995

§ 102(e) Date: Dec. 5, 1995

[87] PCT Pub. No.: WO94/20910

PCT Pub. Date: Sep. 15, 1994

[30] Foreign Application Priority Data

Mar. 1, 1993 [SE] Sweden ................................... 9300671

[51] Int. Cl.$^6$ ...................................................... G06F 19/00
[52] U.S. Cl. ................................................................ 707/511
[58] Field of Search ..................................... 395/331, 332, 395/329, 617, 619, 618, 477, 726, 772, 208, 209; 707/201, 203, 511, 530, 531

[56] References Cited

U.S. PATENT DOCUMENTS

| | | | |
|---|---|---|---|
| 5,008,853 | 4/1991 | Bly et al. | 395/331 |
| 5,040,142 | 8/1991 | Mori et al. | 707/511 |
| 5,132,900 | 7/1992 | Gilchrist et al. | 395/609 |
| 5,142,674 | 8/1992 | Barker et al. | |
| 5,161,214 | 11/1992 | Addink et al. | |
| 5,287,501 | 2/1994 | Lomet | 395/618 |
| 5,337,407 | 8/1994 | Bates et al. | 395/331 |
| 5,446,880 | 8/1995 | Balgeman et al. | 707/201 |
| 5,535,322 | 7/1996 | Hecht | 395/201 |
| 5,649,200 | 7/1997 | Leblang et al. | 707/203 |

FOREIGN PATENT DOCUMENTS

| | | |
|---|---|---|
| 0 472 796 | 3/1992 | European Pat. Off. . |
| 2263988 | 8/1993 | United Kingdom . |

*Primary Examiner*—Donald E. McElheny, Jr.
*Attorney, Agent, or Firm*—Pennie & Edmonds LLP

[57] ABSTRACT

Method for distributed work flow management in a distributed data processing system comprising node units (18,20, 22) connected in a network (12), whereby data can be communicated between node units (18,20,22), each node unit (18,20,22) comprising data processing means, data storing means, data presentation means and data communication means, the system comprising coordinating means in which method a case is initiated, said case comprises case specific application data and case specific control data, said case is transferable between a first node unit (18) and a second node unit (20) and/or between a first and a second location defined in one node unit (10,14,18,20,22) or in different node units (10,14,18,20,22), and wherein said case is processed in a case handling process which is defined and controlled through said control data. In an arrangement for executing the method a node unit (18,20,22) comprises a user interface unit (24), an information presentation manager (26), a distributed work flow management unit (28), a database manager (40), an application/external component unit (30), an authorization manager (32), a data transport manager (34) and a data communications means (38).

21 Claims, 4 Drawing Sheets

DISTRIBUTED WORK FLOW MANAGEMENT

This invention is directed to a method for managing distributed work flow. This invention also concerns an arrangement for performing the method.

BACKGROUND OF THE INVENTION

In many enterprises there is an organized flow of information and work between departments and workers, in short called work flow, the work flow being managed according to certain rules. This is true for office work places, such as banks or insurance companies, as well as for manufacturing plants. The flow of information and work is in prior art realized as a flow of paper documents that in many cases initiate certain pieces of work in certain stations in the flow path. The paper documents may e.g. be sales orders, invoices and credit applications in an office, and e.g. manufacturing orders, requisitions and manufacturing statistics in a manufacturing plant.

While keeping a paper based work flow, offices have now to a large extent been equipped with personal computer terminals or micro computer networks. Some work places have become so automated that they require constant interaction between a user and a computer. In manufacturing plants computer equipment is often installed on the shop floor to monitor and improve productivity and to control the production process. Many large enterprises have installed communications networks comprising data communications means connecting a number of terminals to a central computing site comprising a computer and a database. This provides geographically spread users with access to the computing power of the central computer and to the central database in order to achieve consistent use of common information.

In an enterprise, the organized flow of information and work between departments and users is thus often managed through the use of formal documents and related work procedures. Examples are sales orders, invoices, requisitions, time reports, credit applications, job orders, quotations and purchasing orders. The documents consists of sheets of paper of different kinds, e.g. preprinted forms, notes, letters, memos, computer print-outs etc.

PROBLEMS IN PRIOR ART

The computerization of enterprises according to prior art is suffering from a number of technical problems.

One technical problem is to provide the users with sufficient availability of computing services in a central computing site and/or availability of common information in a central or distributed database. Insufficient availability is often due to slowness and instability in the data communications means.

Another technical problem is that a malfunction in the data communications means may disconnect a group of users from a central computing site.

Yet another technical problems is that a planned or unplanned outage of a central computer disconnects all its users from all central services.

In cases where the computer terminals are provided with processing power and storing facilities enough to handle the needs of the users, such as micro computers, there is the technical problem to control the spread of information and resources.

Another technical problem is to establish a work flow that allows a computer to interact with a human user.

Another technical problem is to coordinate a paper based work flow and a computerized work flow.

Yet another technical problem is to handle original documents in a computer network.

OBJECTS OF THE INVENTION

The main object of the invention is to solve the above mentioned and other technical problems.

Another object of the invention is to provide a method for increasing the efficiency of work flow.

Yet another object of the invention to provide a method for improving the timeliness, dependability and speed of a work flow.

Another object of the invention is to provide a method that reduces or eliminates the need for paper handling in a work flow.

Still another object of the invention is to provide a method for management of work flow in a distributed data processing system.

Another object of the invention is to provide an arrangement for the execution of the method according to the invention.

Another object is to provide a method and arrangement for, in a system comprising multiple different database managers, transferring information to a certain database manager to execute a transaction and maintain consistency and integrity.

BRIEF DESCRIPTION OF DRAWINGS AND APPENDICES

For a more complete understanding of the present invention and of further objects and advantages thereof, reference is now made to the following description taken in conjunction with the accompanying drawings, in which.

Appendix A is a list of definitions of terms used in this application.

Appendix B is a description of functions and functional units comprised in the distributed work flow management arrangement.

INTRODUCTION TO THE INVENTION AND ADVANTAGES THEREOF

In this chapter an introduction to the invention is given together with an account of some of the advantages of the invention. Many of the terms used in this application are further explained in the list of definitions in Appendix A.

The above mentioned technical problems are solved and the objects of the invention are obtained by providing a method which allows the replacement of papers and paper handling in a work flow. The method is carried out by means of a distributed work flow management arrangement. In this application this arrangement is also called a DWFM arrangement.

Figure 1:
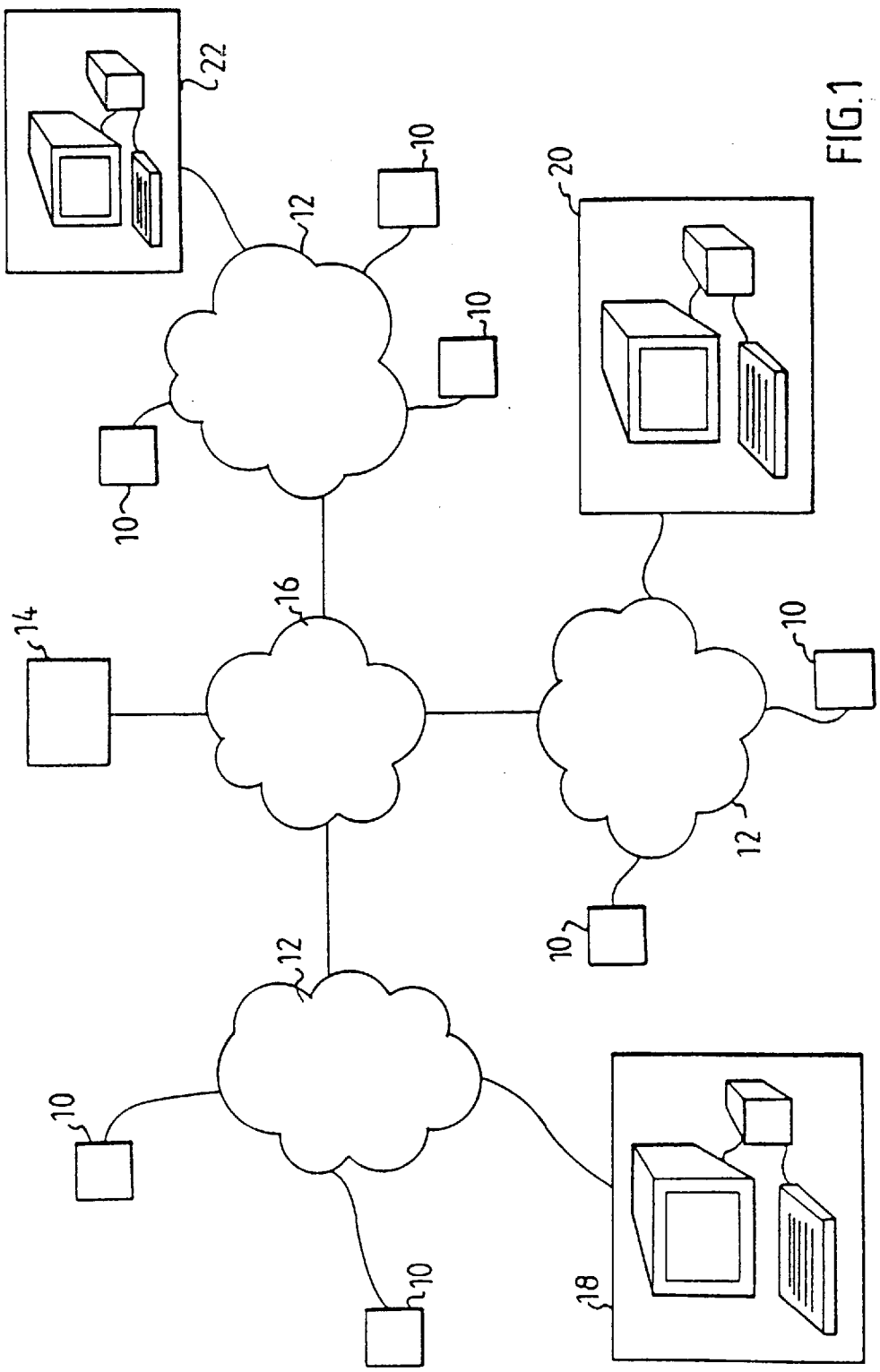
FIG. 1 shows an illustration of a distributed data processing system.

An arrangement suitable for carrying out the inventive method is described with reference to FIG. 1, which shows a distributed data processing system comprising node units 10, 14, 18, 20, 22 connected in a network 12, 16, whereby data can be communicated between node units 10, 14, 18, 20, 22, each node unit 10, 14, 18, 20, 22 comprising data processing means, data storage means, data presentation means and data communication means. In a typical example of such an arrangement each user has access to a personal micro computer system in a node unit 10, which micro computer system comprises means to present complex information through a graphical display and which is able to exchange messages with other micro computer systems, being comprised in other node units 10, through a data communications network 12. It is, of course, within the scope of the invention to present information or data by means of other presentation devices, e.g. sound presentation means. In FIG. 1 three first networks 12 of node units 10 are connected to a coordinating node unit 14 through a second network 16. Said coordinating node unit 14 may be common to all node units 10, or a node unit 10 may be designated as a coordinating node unit 14 for a certain purpose or task. In this application the words central node unit and mainframe refer to a coordinating entity, e.g. a node unit or a location.

The method according to the invention allows for distribution of processing power and information to the end users at each node unit 10, while at the same time retaining necessary central control over processes and data. In addition to the processing power provided in each node unit 10, the user may have access to information in a database located in the coordinating node unit 14. With the inventive method, said information can be stored and processed in a local node unit 10, thereby reaching a high degree of local autonomy. Thus, improved availability of data, performance and ease of use for the end users is achieved, while maintaining control over the use and consistency of data.

In each node unit in a DWFM arrangement at least one location is defined. A location is a uniquely named entity which corresponds to the functional components that executes the inventive method. A first location may communicate with a second location.

For an enterprise advantages of the invention are, inter alia,:
lowered cost to produce and handle documents,
instantaneous transportation of documents between users,
improved management of the case processing flow,
shorter time to complete a work process,
higher volume without adding user resources.

Different aspects of distributed work flow management require different operational application programs. One embodiment of the invention provides a set of generalized case handling functions that entail, inter alia, the following advantages for the development of applications:
simplified design through predefined application architecture,
less program code to design, develop and test,
common standard which simplifies inter-application communication.

A computerized management of a work flow system according to the invention supports most of the well-known attributes of a paper based work flow system, e.g. folders, binders, trays for incoming and outgoing mail, mail sorting, selection of current work, etc. In addition, it improves the ability to quickly re-order, find, file, transport, request and send documents. For a user the advantages of the invention are:
enhanced document handling functionality (?),
common work flow system behaviour ensured by standardization,
improved recognition and understanding of the functions of the work flow,
greater confidence in the work flow system, and in own ability to operate it,
less time spent handling paper, more time executing the tasks,
improved work quality.

DESCRIPTION OF EMBODIMENTS OF THE INVENTION

Prior Art Paper Documents Versus Inventive Digital Counterparts

In this subchapter the inventive method is compared with prior art to illuminate the contrast.

According to the inventive method a paper document is substituted with a digital counterpart, i.e. represented digitally as a case. In fact the inventive method for distributed work flow management makes systematic use of the paper based counterpart, and a number of functions that are served by the paper document are supported. In this patent application the word case refers to an instance of a formal document, associated documents and other information and related activities, all represented digitally.

In prior art a paper document serves as a source of information. Forms, letters, notes and margin scribbles relay information to the reader of the document and guide the necessary processing and decision making. In the invention this aspect is substituted by the support of a case database where the corresponding information is stored and retrieved by application programs. Powerful support is provided in order to prevent the user from feeling the need to revert to the use of papers.

In prior art the internal or external mail serves as a way to transfer paper documents between users. In a computer based work flow management according to the invention this function is provided by data communications means with highly improved speed and reliability.

In prior art a document will trigger action when received by a user. According to the inventive method a case will be transported to the correct user and appropriate action will be prompted to be taken in a timely fashion. Hence, overall reliability will be improved and paper piles, overflowing desks and the misplacement of documents will be eliminated.

Case Handling

According to the inventive method a case may comprise only one original document, and can then be handled by only one user at a time. A case may also comprise a set of identical or similar document copies, each having its specific use. The latter type of case is divisible and may be processed in parallel by a number of users, which speeds up the handling of the case and thus shortens the time of its flow through the current organization. Information and processes are managed by the inventive method so as to maintain necessary data consistency requirements.

In one embodiment a case consists of a case envelope and a case profile. The case envelope contains user data, which is information that applies to a specific case, i.e. documents, forms, notes, etc. The case profile contains control data in the form of processing directives. This control data can generate control signals that affects at least one component of a DWFM arrangement, e.g. to transfer a case from a first node unit to a second node unit.

CASE DEFINITION

Figure 2:
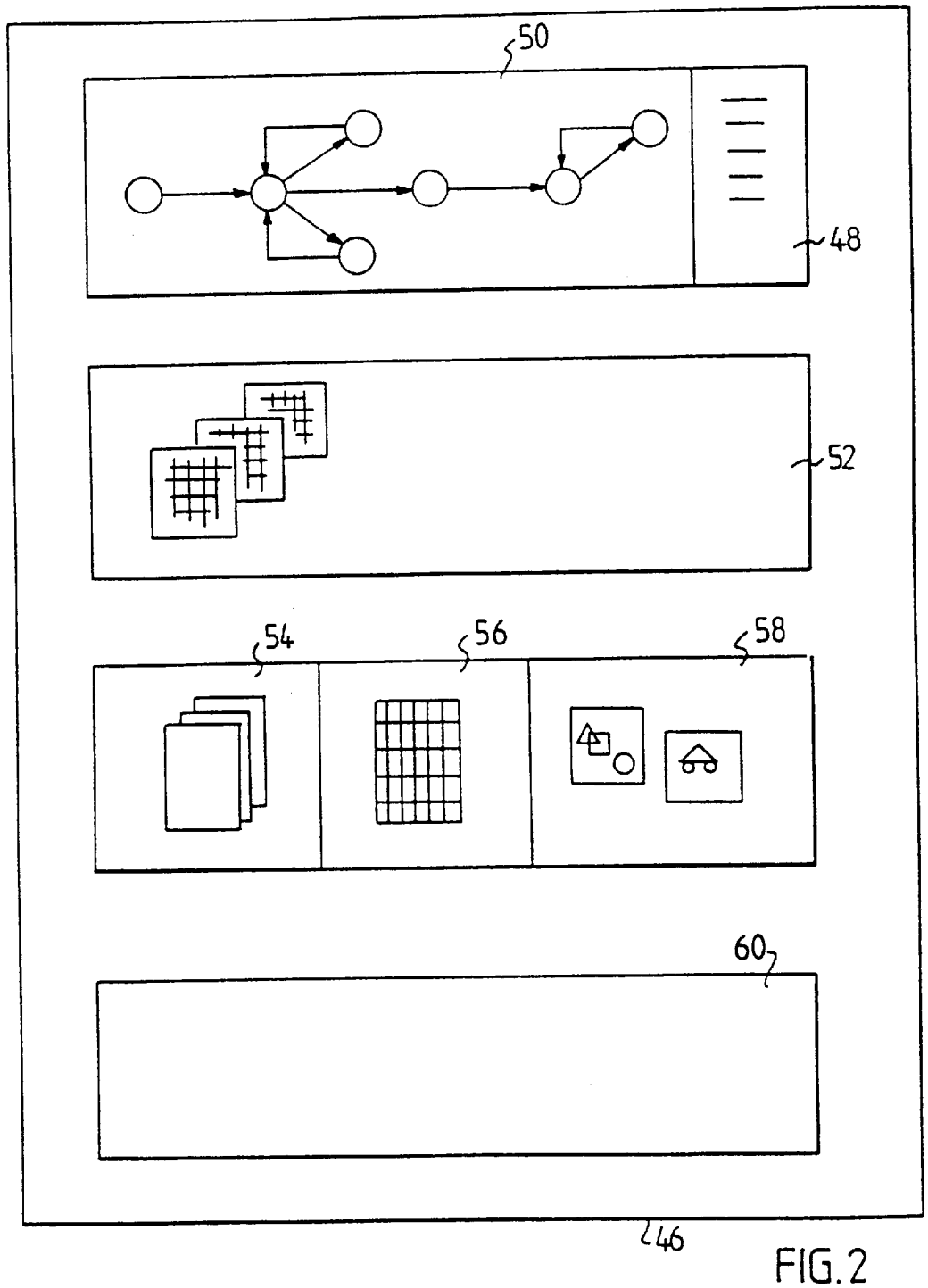
FIG. 2 shows an illustration of the contents of a case.

FIG. 2 shows the structure of a case 46. The case 46 comprises control data 48 that specifies the processes and operations a case will undergo, and a case processing plan 50 that specifies the sequence of operations a case will go through. A case further comprises application data e.g. in the form of parts of databases 52, documents 54 of different kinds, e.g. notes, letters, forms etc, tables 56 and picture documents 58, e.g. drawings, photos etc. A case may also comprise information 60 on related activities, related cases and different work procedures. Thus a case comprises control data a and application data in the from of structured information b1 and other information b2 in separate files.

Figure 5:
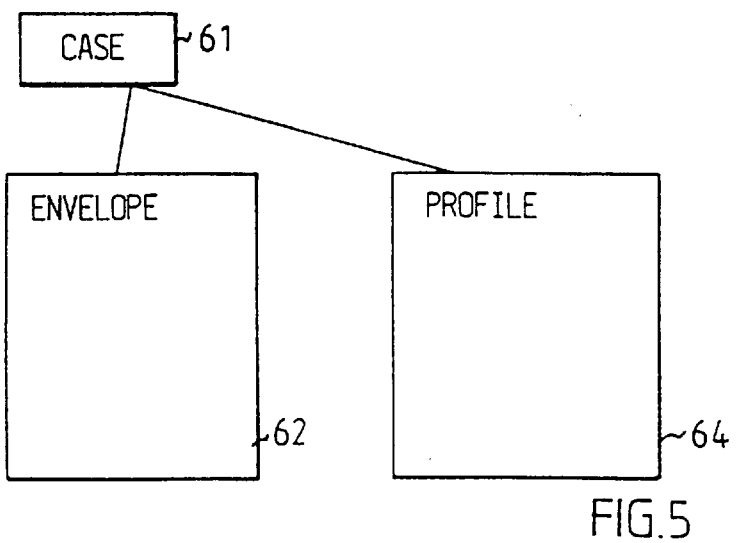
FIG. 5 shows the structure of a case.

FIG. 5 shows that the information comprised in a case 61 is structured as an envelope 62 and a profile 64. The envelope 62 contains application data, such as a number of documents, and the profile contains control data such as hold location, processing table and variable pool.

The control data a and the structured application data b1 is stored in a form that is independent of hardware environment, operative system and program language. The information b2 in separate files may have any format, e.g. a text document for the application program Word for Windows. The data or information a and b1 can be viewed as fragments of a database and the storage form allows that such information is transferred between different node units and locations, and is transformed to and from the format and the specific storage format that is preferred in a given node unit or location.

A case is divisible in its components, but is a basic unit. If cases are divided in subcases, these cases are related cases, where each case is a basic unit, but the processing plans of each subcase specifies a coordination such that the subcases cooperate and are parts of the original case.

A case is characterized as a small database that is transported between database managers in different node units and locations. An operation is always executed in one defined location, e.g. in a database manager. There is application code in every node unit. All nodes and locations constitute a common correct, consistent database, because the information is structured to be transportable with maintained consistency and integrity. Every case comprises, as mentioned above, control data and application data and comprises the whole processing plan for the case.

A case is processed step by step (refinement steps), whereby these steps are defined by the processing directives. Each processing directive specifies the user who should process the directive, when it can or must be processed and in what location or node unit the processing can be performed. This information is external to any application program or procedure that actually performs the processing. Processing directives may be independent of each other, or may be related. For example, an independent processing directive may present all user data currently comprised in a case, an action which can be performed at any time. On the other hand, a group of dependent processing directives may implement a sequence required e.g to gather decision data and to make and effectuate the decision for a particular issue in the work flow, a sequence of actions that may only be performed once.

Thus, the information needed to manage the flow of a case between users and locations is extracted from application programs and is stored in specifically named DWFM variables. The maintenance of such information is made easier compared to prior art since no knowledge of the application program is required, which is a great advantage when a company reorganizes work locations and departments, or changes the way a case is processed. The separation of DWFM information from application programs enables that it can be decided independently when to transport a case from a first location to a second location, or to alert a user to perform a manual action.

Data necessary to process a case, i.e. application data, DWFM data and end user data is stored in a case variable pool and in an associated case envelope. A variable pool is a set of uniquely named variables or simple data items of different sizes and contents. In one embodiment, these data items are self-defining and consequently allow conversion between different data formats. The case envelope may store any kind of data files produced by different application programs or PC tools, such as text documents, spread sheets, captured images, voice recordings etc.

The inventive dynamic storage technique has several advantages over the formatted record technique used in prior art, e.g.:

Application data can be stored in the variable pool by application programs, which reduces the need for additional application files. This eliminates the design of record layouts and the implementations (design, code, test and maintenance) of program definitions, hardware definitions, file access routines, space reclamation routines and data recovery routines.

Application data is automatically transferred together with the case, since the data that is stored in the variable pool is part of the case. When the case is moved between first and second locations and users, the information contained in it is immediately available for use by the user and application programs at the second location. In prior art, where information is stored in user files or data bases, information would have to be transferred between these storage forms through application specific routines and transferred to a second location through an application defined procedure.

Application data is shared between components of the DWFM arrangement. For example, a presentation means can access application data directly for presentation and alteration and reduce the need for application routines for presentation handling needed in prior art.

Reduced application program maintenance. A variable pool is arranged to be able to contain all possible variables, i.e. a defined value is associated to any possible variable name. Accordingly, when a new variable is added a new value is associated to the named variable. Consequently, changes to system data or application data do not, as in prior art, require modification or addition of files, change of records or fields and corresponding changes to definitions and code. This will significantly reduce the maintenance effort, which is especially valuable in a distributed data processing system.

End user data is easily stored. A case often contain data, e.g. meeting notes, sample calculations etc., that is not accessed by application programs. Such data may also be recorded in a case variable pool or case envelope, again with no limits on number of items or their size.

LOCATION HIERARCHY

In each node unit within the inventive arrangement at least one location is defined. (See also appendix A). The location is a named entity where processing of a case is executed. The location is placed in a distributed work flow arrangement which constitutes a DWFM environment. A DWFM environment is the environment where the functions of the inventive arrangement can operate. The locations are structured in a hierarchical way so that a first location may be a coordinating location for a second location.

Figure 3:
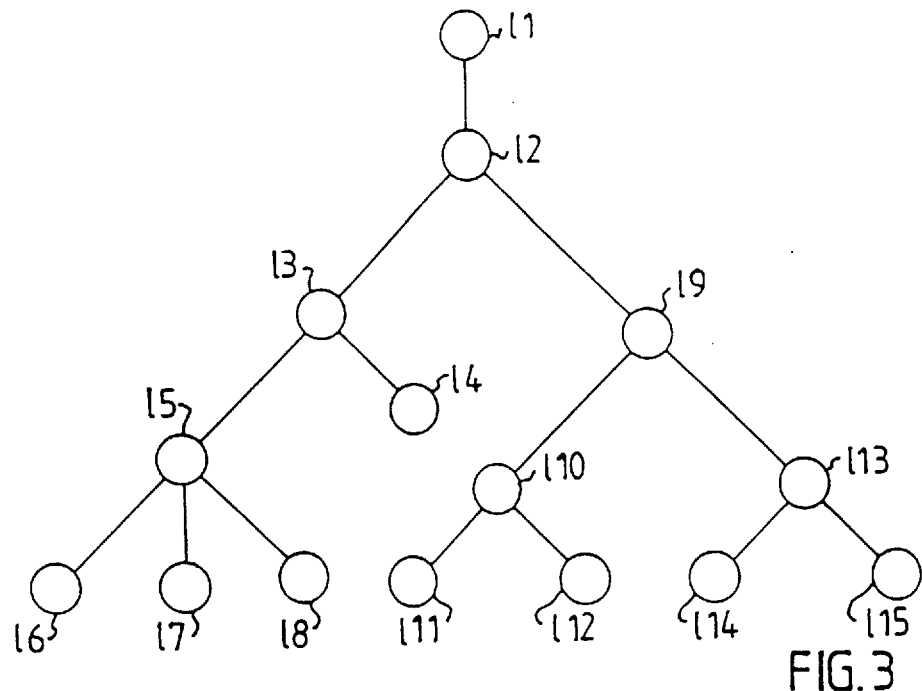
FIG. 3 shows a hierarchical location structure.

FIG. 3 shows an example of how locations 11 to 115 may be structured. In FIG. 3 location 11 is coordinating location for all locations 12 to 115, and in an analogous way e.g. 110 is a coordinating location for 111 and 112. A coordinating location e.g. 110, keeps information about a case being located in coordinated locations, e.g. 111 and 112. A case may be requested from coordinated locations by a coordinating node, and the case can in this way be found and transported from any first location to any second location in the hierarchy.

For a case at a first location there is either no coordinating second location and consequently there is no further information on said case to find in any second location; or one and only one second coordinating location is defined for the case, and if the case is no longer available at the first location, information about where the physical location of the case is found may be taken from the second coordinating location.

In the same way the control data comprised in a case is used to control a coordinating location in a node unit, i.e. controls the functional components in a node unit, to transport the case to a location according to the processing plan.

PROCESSING OF A CASE

All processing on a case is made at a location by means of e.g. application programs utilized by a user. All procedures or operations on a case are atomic. Any operation or procedure on the case is committed as a whole or is undone (Rollbacked) if it cannot be executed in its entirety.

In the inventive method the case is processed stepwise, i.e. all operations a case may have to undergo are clearly factored into atomic operations. Each procedure and each operation is well formed, which in this application means that consistency within the case is maintained in every individual procedure or operation. In connection to the event that a case is received at a location and undergoes an operation the following steps are executed: case received is signalled, operation is committed and a reevaluation as to whether the state of the case has changed is carried out.

According to the method each case is appearing as a database from a procedures point of view. Any application program used to operate on the case is controlled to function as a subroutine within the frame of an atomic process, and an operation on the case is committed despite the fact that different applications may be working on the case.

If a first and a second location requisition the same case at the same time it is decided by the control data to which location the case will be transported first. If a first location operates on a case, and a second location requests the case, the case is either locked and the second location must wait until the first location is ready processing the case, or the second location may get a readable but not alterable copy of the case. This copy is then marked as the last committed version of the case.

Figure 4:
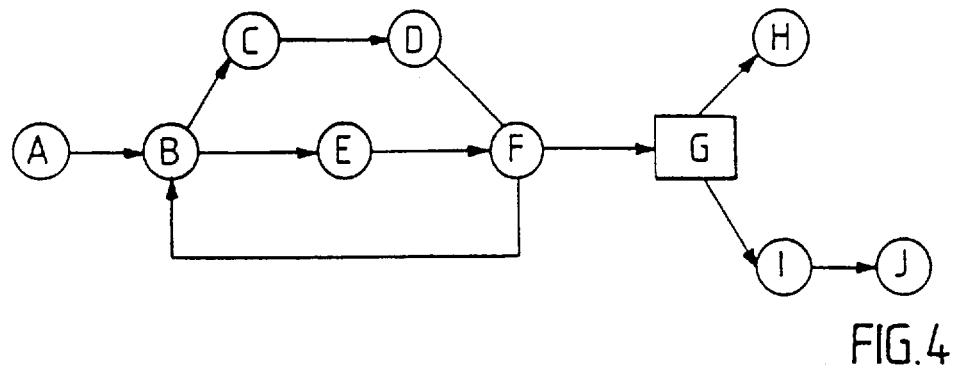
FIG. 4 shows an example of the processing sequence of a case.

FIG. 4 shows an example of a chart of operations comprised in the processing of a case, whereby each circle represents an individual operation or step. The arrows indicate the processing sequence of operations. Some operations are executed in a definite sequence, some in any order and some are optional. The possibilities for operations to occur in parallell are governed by case sharing rules comprised in the control data of a case. A case is lockable and may be locked and released to expose it or parts of it to different operations. A case may be marked and under operation, when it is locked, it may be readable or unreadable.

Atomic operations or transactions are guaranteed by the usage of a local, correct database manager in every node unit or location.

DETAILED DESCRIPTION OF AN EMBODIMENT

The method according to the invention will now be further explained by a detailed description of an embodiment of the inventive arrangement. The inventive method may executed by means of a general computer in conjunction with especially designed hardware installed in a node unit and/or especially designed software executed in said node unit. In this specification will be described an arrangement for distributed work flow management comprising a distributed work flow management unit, henceforth also called a DWFM unit, which arrangement and which unit comprise a set of functional components here implemented as computer programs. Each node unit in a distributed data processing system may comprise a DWFM unit and related components.

The different components of the arrangement utilizes a CPU, an ALU, and busswires comprised in the data processing means of a node unit, to control other components within the arrangements.

Figure 6:
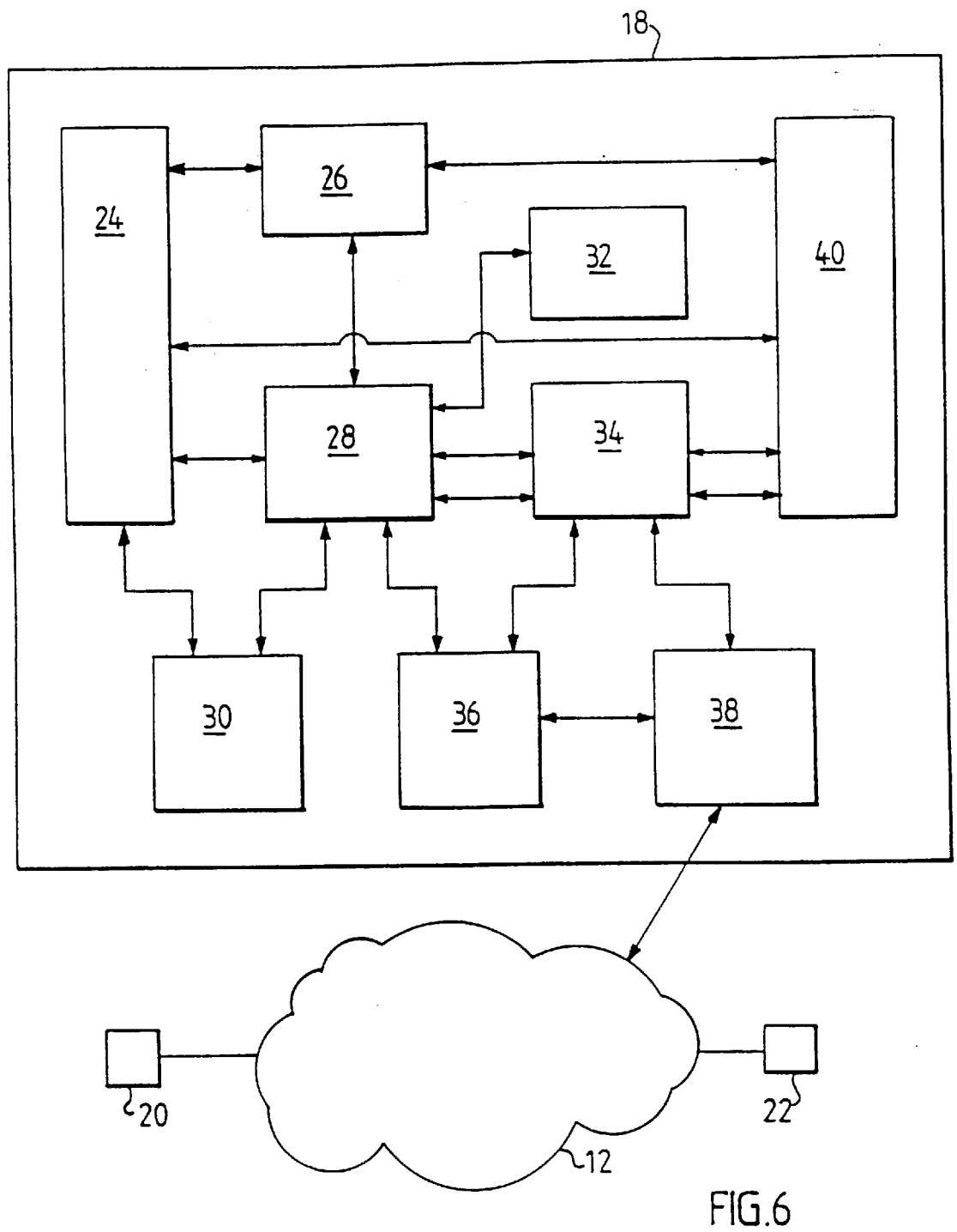
FIG. 6 shows a schematic illustration of an arrangement according to the invention.

FIG. 6 shows schematically components comprised in a first node unit 18 in an embodiment of an arrangement for distributed work flow management. The first node unit 18 as well as a second node unit 20 and a third node unit 22 are connected to a data communications network 12. In FIG. 6 a user interface unit 24 is functionally connected to a presentation manager 26, a variable pool manager 40, a DWFM unit 28, which comprises further functional components described below, and to an application/external component unit 30. In this text functionally connected or simply connected means that data and/or control signals can be communicated between components that are connected. In the figure this functional connection is shown by a connecting line with or without arrowheads. The node unit 18 further comprises an authorization manager 32, a data transport manager 34, an interprocess communication manager 36 and a data communications means 38. The interconnection between the above components 23 is clear from FIG. 6.

The user interface unit 24 comprise different user interfaces through which the users, i.e. human end users, system developers and application programs, request services from the different components of the arrangement, e.g. a DWFM request interface, a presentation manager interface, etc. The DWFM Request Interface allows a user to manipulate DWFM data and case data, perform DWFM functions and DWFM procedures, and request services from external components such as display managers, word processors, spread sheet packages, data base managers, etc.

The distributed work flow management (DWFM) unit 28 comprises functional components for the definition, management and processing of a case according to the inventive method. These components are operated internally in the DWFM unit 28 and are available to a user through a DWFM request interface (explained below, see also appendix A.

The presentation manager 26 provide functions that include assistance in building screens, interactions with workstation hardware (screen, keyboard, mouse) and with application programs. Such basic functionality is e.g. provided by the Presentation Manager component of the operating system OS/2, and more powerful support can be obtained from several display managers currently on the market, e.g., Easel. The presentation manager 26 is interconnected with the variable pool manager 40 and makes direct use of the variable pools which results in the following advantages:

A common method of exchanging data between all components in the arrangement reduces effort and errors incurred by the prior art transformations of names, values and data models between different storage forms.

Value editing and domain checking may be tied to a variable. Most prior art presentation managers will perform some editing of the user's input. However, the editing specification is according to the inventive method included within the definition of the "screen". If a particular field exists as input field on many "screens", the editing rule is replicated. If the editing requirements change, all "screens" containing that field are located and changed. The editing rule is tied to the variable into which the value of the particular field is stored, thus only one change is required, since the same variable is referred to by all "screens". The presentation manager functions as the communication link between an end-user at the work station and the remaining components in the arrangement. It provides high-level functions to develop, implement and handle visual interactions using a common presentation standard, e.g. SAA CUA.

The variable pool manager 40 is a database manager that supports the data storage requirements of the components. It supports a name-value pair data model and provides data storage and retrieval functions, recovery-scope management and data recovery functions. See also appendix A.

The inter-process communication manager 36 comprises functions that allow a process to:

1. Request the execution of a program within a given node unit in the network 12 (the same node unit of another node unit within a LAN or a WAN) immediately or at some future time.
2. Verify whether a given program (process) is executing at a given node unit and if so, be provided with the details on how to establish a connection with the executing process.
3. Establish connection with another process.
4. Exchange messages with a given process using a set of different message protocols:
   delivery guarantees, e.g., best effort, at most once, at least once, exactly once.
   delivery time, e.g. immediate, as soon as possible, at a given time.
   message size.
5. Terminate connection with another process.
6. Request the termination of an executing program in a given node unit.

The application/external component unit (30) comprises application programs or general PC tools used by the user to perform case processing and to create or modify data that is associated to a case. The DWFM unit provides functions to invoke such external processors, to pass data to and from them and to reinstate DWFM programs following the completion of an external process.

The authorization manager 32 is responsible for the verification and authorization of user requests for access to functions and data within the DWFM arrangement. Further, it provides information uses by the DWFM unit when it selectively presents possible "work to do" options to users.

The data transport manager 34 provides function for reliable transport of case data and system DWFM control data between locations. It implements the necessary protocols to ensure un-attended transport between network node units of different brands and configurations of units of data of any size without loss or duplication. This may e.g. comprise a TQM unit executing a method described in the copending PCT patent application with the title Transaction Queue Management.

The data communication means 38 supports the data communication and networking requirements of the arrangement. It completely insulates other components from the management and use of the physical layers, link layers and network layers of the communication means.

The arrangement may also comprise a DWFM high level language manager, the language being encoded in a language independent form not shown in FIG. X1, for managing a free form programming language, designed for use in processing directives, for handling presentation to and interactions with a user, manipulation of case envelope components, interfacing to different data communications means. It conforms to the principles of structured programming, i.e., provides functions required for top-down modular programming, recursive invocation of processes with "dynamic" memory, etc. It is executed in an interpretive fashion, which provides for quick development and easy de-bugging. At the same time it is intended to be used by non-programmers, i.e., simple problems may be implemented without understanding the complete language. This allows end-users to automate many aspects of their work without assistance from a programming department of an enterprise. The language has the same level of power as e.g. the REXX language.

The arrangement may further comprise an application programming interface, not shown in FIG. 6, to be used in situations that require application programs to be developed using common programming languages such a COBOL, C. etc. Typically this occurs when the level of complexity or performance requirements are too high for the DWFM language mentioned above. The arrangement provides an application programming interface which may be adapted to many commonly used programming languages. Through the application programming interface application programs will have access to all functions provided by the components of the arrangement.

Detailed Description of Components Comprised in a DWFM Unit

In this chapter a number of components, functions and entities comprised in DWFM unit 28 are described. Some of the components are described as computer program procedures but may also be implemented as hardware. Many of the terms and expressions are further explained in the list of definitions above.

DWFM Request Interfaces

The DWFM request interfaces allow the user to request services from the different DWFM components during the execution of a DWFM procedure.

The preferred embodiment of the invention comprises three DWFM request interfaces:

1. A user command interface (UCI), which allows users to request DWFM services through entering DWFM commands from a terminal keyboard or through other means.
2. Processing directive interface (PDI), which allows users to specify processing to be performed by the DWFM unit as part of the evaluation of the processing table of a case, i.e., the processing is performed by the DWFM unit based on the user specified processing directives.

3. An application programming interface (API), which allows application programs to request services from the DWFM to be performed. The syntax of the API interface may depend on the supported programming languages (COBOL, C. REXX).

Different functions are available to a user depending on the user's authorization and the operational circumstances surrounding the use of an interface (case selected, procedure initiated, etc.). Consequently, the contents of a user variable pool may only be accessed by a given user, or process acting on his behalf; the contents of variable pool for a given case may only be modified by the execution of a processing directive within the processing table of the case for which the prerequisites are satisfied, or by the responsible user through the UCI or API; the variable pool of a procedure may be modified during its execution through any interface including the UCI or API.

There are slight syntactical differences between the interfaces. However, the functional power and semantics are identical, i.e., when a function is available to a user through different interfaces, then the given function "behaves" in the same manner regardless of the interface used.

The following sections describe the DWFM service requests that are available through the DWFM request interfaces. The request names are shown in upper case letter and are followed by a set of characters within braces. The meaning of these characters are:

D The request will Dismantle the current consistency interval.

E The request will Establish a consistency interval.

I The request is an Immediate request, i.e., it can be performed without any user intervention or communication with another location.

N The request is Non-recoverable, i.e., its result is not affected by consistency interval processing.

R The request is Recoverable, i.e., its result is affected by the COMMIT or BACK-OUT of an encompassing consistency interval. The request will establish a system generated consistency interval unless one currently exists.

U The request is a User request, i.e., it requires the intervention of a user.

These requests are given as parameters in request procedures, wherein a character enclosed within parenthesis signifies that the described effect may occur. The following requests and procedures are comprised in the DWFM unit:

Case Transportation

TRANSPORT CASE {I(N)} Requests that a given case be transported to a given location. The request may specify IMMEDIATE or DELAYED transport. If IMMEDIATE, then the request will fail if the case is unavailable or the transport fails (see Case Transportation). DELAYED indicates that the requester is satisfied to initiate a transport attempt and expects to be notified when a request has been performed. Such a DELAYED request may indicate that the transport mechanism should be invoked immediately or at a later time to perform the transportation. The request will fail if a session is not established.

Consistency Management

ESTABLISH CONSISTENCY INTERVAL {EIR} Requests the establishment of a consistency interval unless one is already established. Upon the successful completion of the request, a current consistency interval is established. The newly established (current) consistency interval is associated with the current procedure as a user generated consistency interval. The request will fail if a session is not established.

DISMANTLE CONSISTENCY INTERVAL {DIR} Requests the dismantling of the user generated current consistency interval and later (pending) recording (COMMIT) or discarding (BACK-OUT, ABORT) of changes for itself and all related consistency intervals. The request will fail if a session is not established or if an associated user generated current consistency interval is not established.

Case Management

REQUISITION CASE {(E)IR} Requests a given case, existing or non-existing, to be made available and reserved for EXCLUSIVE use by the requester at the current location, i.e., the location of the requester. The request will fail if a session is not established or if the case is reserved (see Case Requisition And Release).

READ-ONLY and UPDATE requisitions may be supported.

RELEASE CASE {(E)IR} Requests that a given case, reserved by the requester, be released for use by other requesters. Following the request, the given case will no longer be available for processing by the requester, but may be re-requisitioned. The request will fail if a session is not established or if the case is not requisitioned.

CREATE CASE {(E)IR} Requests the creation of a given non-existing case that has been successfully requisitioned by the requester. Following the successful completion of the request, the created case will exist. The request will fail if a session is not established, if the given case is not successfully requisitioned or if the case already exists.

ACTIVATE CASE {(E)IR} Requests activation of access to a given existing case that has been successfully requisitioned by the requester. Upon the successful completion of the request the given case is established as current case. The processing table within the current case becomes the current processing table. As an extension, related processing directives may be executed, see Related Cases And Procedures. The request will fail if a session is not established, if the given case is not successfully requisitioned by the requester or if the case does not exist.

DEACTIVATE CASE {(E)IR} Requests that access to the current case be deactivated, and that changes made to case data (profile and envelope) be either RECORDed (for possible later commitment), or DISCARDed. The request will fail if a session is not established or if a current case is not established.

TERMINATE CASE {(E)IR} Requests the termination of a given existing case that has been successfully requisitioned by the requester. Following the successful completion of the request, the given case will cease to exist. The request will fail if a session is not established, if the given case is not successfully requisitioned or if the case does not exist.

Procedure Management

EXECUTE PROCEDURE {(N)(R)(I)(U)} Starts a logical unit of work. The procedure started may start a session, cause a processing directive to be executed, start a subprocedure or start an external process. The actual processing is determined from the Procedure Type table at the location.

END PROCEDURE {(D)IT} Requests that the current procedure (session, processing directive or external operation) be terminated. If the current consistency interval is system generated and is associated to the current procedure then that interval will be dismantled for later (pending) COMMITment. The request will fail if a session is not established.

Variable Manipulation

ASSIGN VALUE {(E)IR} A given value, or set of values, will be assigned to a named variable within a given variable pool. The request will fail if a session is not established or if the given variable or variable pool is unavailable for assignment. Substitution and sub-string notation is supported.

REFERENCE VALUE (I) The value, or set of values, of a named variable within a given variable pool is returned to the requester. The request will fail if a session is not established or if the given variable or variable pool is unavailable for reference. Substitution and sub-string notation is supported.

TEST VALUE (I) The value, or set of values, of a first and a second literal string or named variable within a given variable pool will be compared and the result, "<" (for first<second), "=" (for first=second) or ">" (for first>second) is returned to the requester. The request will fail if a session is not established or if a given variable or variable pool is unavailable for reference. Substitution and sub-string notation is supported.

Expression Evaluation

EVALUATE LOGICAL EXPRESSION (I) A literal string or the contents of a named variable within a given variable pool is evaluated as a logical expression and the result (TRUE or FALSE) is returned to the requester. The request will fail if a session is not established, if the given variable or variable pool is unavailable for reference, or if the contents does not adhere to the logical expression syntax.

EVALUATE SET CREATION EXPRESSION (I) A literal string or the contents of a named variable within a given variable pool is evaluated and executed as a set creation expression and the resulting set is returned to the requester. The request will fail if a session is not established, if the given variable or variable pool is unavailable for reference, or if the contents does not adhere to the set creation expression syntax.

EVALUATE ACTION SPECIFICATION EXPRESSION [(E)IR] A literal string or the contents of a named variable within a given variable pool is evaluated and executed as an action specification expression. The request will fail if a session is not established, if the given variable or variable pool is unavailable for reference, or if the contents does not adhere to the action specification expression syntax.

Processing Table Management

IMBED PROCESSING TABLE [(E)IR] A literal or the contents of a named variable within a given variable pool is used to reference a member of the location processing table set and the processing directives within the given processing table become part of the current processing table temporarily or permanently. The request will fail if a session is not established, if the given variable or variable pool is unavailable for reference, if the member cannot be found, if the reference processing table has an invalid format or if any component parts do not adhere to the corresponding expression syntax.

Authorization Control

CHECK AUTHORIZATION (I) A literal string or the contents of a given variable containing an authorization expression is evaluated, and the value TRUE is returned if a given user is authorized to access or process the associated object.

Expressions and Processing Directives

This section describes how the logical, variable assignment, set creation, action specification and authorization expressions are used according to the inventive method.

Logical Expression

An expression that will produce a value, TRUE or FALSE. The expression consists of conditional statements combined by logical operators (Boolean). The value of each conditional statement, and of the expression, is either TRUE or FALSE. The expression operates on variables and constants. The value of an empty expression, or an empty conditional statement, is evaluated as FALSE.

Variable Assignment Expression

An expression that assigns a value, or a set of values, to each of a set of given variables.

Set Creation Expression

An expression that will produce a (possible empty) set of values. The expression is composed of a set of conditionally executed logical and variable (set) assignment expressions.

Authorization Expression

An expression that will produce the value TRUE when a given user is authorized to process or access and associated object, or the value FALSE otherwise. The syntax of the expression is defined by the Authorization manager.

The Execution of a Processing Directive

The expressions within a processing directive are evaluated and executed by the Distributed Work Flow Manager at different times. When any expression within a given processing directive is executed for a given case, the given case is established as "current case".

Directive Description Expression

An expression that will produce a text that describes this directive. If the expression is empty, the directive description is evaluated as an empty string.

Performance Location Expression

A set creation expression that will produce a set of location names. If the expression is empty, the performance location is evaluated as the name of the current location. To ensure consistent results, the expression only references variables within the variable pool of the associated case, i.e. it is designed to be evaluated at any location.

Performance Qualification Expression

An expression that produces four values:

1. Performance Qualifier: NEVER, CANNOT, NOT_YET, MAY or SHOULD; default value is MAY.
2. Re-Evaluation Time; default value is AT_COMMIT, i.e. at the commit of the execution of an Action Specification Expression for this case; a NOT_YET qualifier cannot have this default value.
3. Early Start Time; default value is "Time of evaluation".
4. Late Finish Time; default value is "Time of evaluation plus delta".

To ensure consistent results, the expression only reference variable within the variable pool of the associated case, i.e. it is designed to be evaluated at any location.

Performance Mode Expression

An expression that produces one of four values: AUTOMATIC, USER, IMMEDIATE or NOT_EXECUTABLE. If the expression is empty, it evaluates to AUTOMATIC. To ensure consistent results, the expression only references variables within the variable pool of the associated case or within the location pool, i.e. it is designed to be evaluated at a performance location.

Destination Rule Expression

A set creation expression that will produce a set of destination names. The set is used to determine the destinations to which action notifications should be addressed for the purpose of notifying users on the need to perform a given processing directive that contains a user action. If the expression is empty, it evaluates to the ANY destination for the current (performance) location. To ensure consistent results, the expression only references variables within the variable pool of the associated case, i.e. it is designed to be evaluated at any location.

Action Description Expression

An expression that will produce a text that describes the action. If the expression is empty, the action description is evaluated as an empty string.

Action Specification Expression

An action specification is composed of a set of conditionally executed variable assignment expressions and DWFM service requests. An action specification that can be processed solely by DWFM components at one location, i.e. that neither requires the intervention of a user nor communication with any other party (user/location), is called an immediate action; an action specification that requires user intervention is called a user action.

Case Sharing Rule Expression

A logical expression that determines if the associated action specification may be executed at the current time. It is evaluated if the associated case is currently being processed and the expression will be given a list of active procedures. If the expression is empty, it evaluates to FALSE. To ensure consistent results, the expression only reference variables within the variable pool of the associated case or within the location pool, i.e. it is designed to be evaluated at a performance location.

Session Management

A session constitutes the "highest level" DWFM procedure, and provides a given user with access to the functions of a DWFM unit at a given location. Each request to the DWFM unit in a node unit by a user is verified for proper authorization. It seems impractical to require the user to identify himself for each and every request; the session concept allows it to be assumed that subsequent requests are in effect issued by the user that initialized the current session.

Session Initiation

When a user, directly or indirectly, requests a DWFM unit to perform a function, and a session is not established, then the request will be rejected. In order to establish a session with the DWFM unit, a user must perform a session initiation process (log-on, sign-on). This can be done directly, through the use of a specific DWFM command, or indirectly, through an application program request, and may be performed at any DWFM location within a network. However, if it is done at the user's work location, then the process does not require any interactions with other DWFM components in the network. The establishment of concurrent sessions at one or multiple locations for a given user may be allowed or prohibited, selectively or generally. A part of the session initiation process deals with user identification, i.e. the establishment of the user's identity. Different methods for identifying a user may be chosen, e.g. simple password, randomly selected question for customized set (mother's maiden name, place of birth, favourite wine), machine readable identification card, physical key, personalized floppy, etc.

Session Termination

The termination of a session disconnects the user from further use of the DWFM services at the location, and also discards the session variable pool. A session is terminated in e.g. one of the two following ways:
1. The user may request the termination of a session by issuing a DWFM command or, indirectly, through an application program request.
2. The DWMF may unilaterally terminate the session when a terminating condition has arisen. Examples of such conditions are: excessive period of inactivity, environment disturbances (power off/on, boot), etc.

In this case, a FORCED termination of the current procedure and associated consistency interval will be performed.

Locking Manager

In a number of situations there exists a need for a DWFM process at a location to reserve the exclusive use of a set of data (case envelope or profile, variable pool, file, record, etc) during a short time. This ensures that the information is kept stable and unchanged during the performance of the remainder of the process. If the data is reserved by another (local) process, then the requesting process awaits the completion of the other process. A DWFM locking manager will provide support for such short term, non-recoverable "locks", and ensure that dead-lock conditions do not occur. Most DWFM facilities described in this chapter will use the services of the DWFM locking manager to ensure data integrity and consistency. However, in order to keep the functional descriptions short, references to the locking schemes have been omitted. Each location is provided with a locking manager to take care of short term locking requirements. This "process synchronization mechanism" can be implemented in a number of ways, and each different environment provides a different "best" solution. The implementation of the locking manager will be fundamentally dependent on the available functions provided by the operating environment, especially the ones supporting shared memory and inter-process synchronization (semaphores and signals).

Case Transportation

When a DWFM system at a location has determined that a given case must be transported to another location, when it needs to access a case which resides at another location, or when a user has issued a CASE TRANSPORT request, then a case transport procedure is initiated. The implementing details of this procedure is dependent on the functionality of the networking means, i.e. the protocols that are supported. The following is assumed as requirements of the networking means of the preferred embodiments.

1. It is unacceptable that the data within the envelope or profile of a case is erroneously lost, i.e. accidentally deleted or lost while being transported.
2. A case is transported in a hierarchical way between pairs of DWFM locations, i.e. if a first node unit has requested the case, and it resides in a second node unit, and if COMMON1 is a superordinate location on a network (WAN or LAN) common to both the first and the second node units, then the transport will occur as second node unit→COMMON1 and COMMON1→first node unit. Node units within a network (LAN) may communicate directly. In another embodiment other pairs of node units are arranged to communicate directly, i.e. node unit-node unit. This would allow avoidance of unnecessary dependence and load on a common node unit. These issues are related to LAN and WAN performance/availability and available inter process communication support.
3. The DWFM unit at each node unit of the communicating pair will indicate that the case is being transported, and that the case is unavailable for processing by any node until the transport is completed. This is NOT a short term lock, it is recoverable.
   In an alternative embodiment a case transfer process is implemented which allows the "sending" location to continue processing the case while it is being transported; this is an extension of copy management.
4. The DWFM unit within a node unit will be based on any available transaction manager and data base (DB/DC) functionality and run within an online transaction processing environment.
   The transport protocol may be implemented using multiple transactions (recovery scopes). Since restrictions are placed on the size of the messages (data to be transported) or the number of bytes changed in the database, then the used DB/DC system may require a transport to be divided into multiple transactions. This can be achieved using the database to store the transport state.

5. A transport can be initiated from a mainframe computer as well as from a personal computer in a node unit.

6. A transportation process may fail due to the case not being available for transportation (requisitioned by other user, authorization, etc), or to network faults or other component malfunctions. The failure will be detected by any of the involved locations directly through local means (locking manager, "time-out", other locally held control information), or indirectly (messages sent as part of the inter-location transport protocols".

If the transport fails, then an appropriate message is returned to the requester stating the reason for failure.

Case Management

A Case Manager comprised in the DWFM unit supports orderly processing of case data.

Case Requisition and Release

The case requisition and release functions execute steps according to the inventive method, ensuring the integrity of case data in a distributed processing environment.

Case Requisition

A given case may be requisitioned, i.e. made available for processing by a given user at a given location, through the use of a DWFM Request Interface CASE REQUISITION request. Also, the DWFM itself may requisition a case for its own use, e.g. for the automatic performance of processing directives. The Case Requisition process comprises the following steps:

1. If the case does not reside at a current first location, then, if so requested, the DWFM initiates a Case Transport request in order to attempt to transport the case to said first location (see "Case Transportation"). This entails the transmission of messages to other locations in the network.

2. When the case is present at said current first location, the usage requirement is evaluated against the current usage for the case. If there is a usage conflict, i.e. the case has been requisitioned (by this or another user or DWFM procedure), then the requisition request is rejected and a message to that effect is returned to the requester.

For a further description of requester usage of case data, see the section "Copy Management".

3. When the case is present at the current first location and is available, then the case is marked as requisitioned (busy, in-use) for use by the requester, and may subsequently be accessed and processed.

Case Release

When a successfully requisitioned case is no longer required for processing, then it must be released in order to be available for use by other users within the DWFM.

The Case Release process comprises the following steps:

1. The case is marked as released.

2. The case is released and is thereby made available for processing by other users at the dismantling of the current consistency interval. The current user may successfully rerequisition the case before that time.

Case Data Access

The Case Data Access mechanism allows for the creation, termination and processing of a case that has been successfully requisitioned.

Case Creation

This function creates a new occurrence of a given case type and gives it a unique name.

The creation of a case comprises the following steps:

1. An un-committed copy of the (empty) case variable pool and envelope is generated from the case type profile and envelope information.

2. The case variable assignment expression is executed in order to create the case variable pool. The "authorization" to create cases may be distributed based on type and name-range.

Case Termination

This function terminates the processing of a case and it ceases to exist. Before a case is terminated, it may be transported to and terminated in the node unit where it was created in order to retain the key-range. A case identity may possibly be re-used for a new case.

Case Access

This function allows for the contents of a given case to be accessed and modified by the requester.

The following step is performed as part of enabling access for a user to a case:

1. An un-committed copy of the case variable pool and envelope is generated unless it already has been done by a previous case access request.

Terminate Case Access

This function terminates the access to the current case. The contents of the un-committed copies are retained for consistency interval processing.

Consistency Interval Management

Establishment of a Consistency Interval

The establishment of a consistency interval is recorded in the location variable pool. This makes it possible to retain this information and process it following "supported" malfunctions and errors.

If an application attempts to establish a nested consistency interval when there already is a consistency interval established, it is ignored and the ensuring processing is executed as part of the main consistency interval. However, the attempts are recorded so that the later dismantling of such nested consistency intervals. This simplifies the structuring of application building blocks.

Dismantling of a Consistency Interval

When a nested consistency interval terminates, only the result will be recorded in the highest consistency interval. When the highest CI terminates, then all un-committed copies (recoverable variable pools and envelopes) will either be discarded (=BACK-OUT) or their contents will replace the corresponding data (=COMMIT). Thereafter, the copies are discarded. According to the invention, the termination process (commit) of case data is supported within the processing location with high local autonomy. Two levels of commit may be defined (nb. not two phase commit), where a level 1 can be supported locally by a location and a level 2 will require interactions with a node unit comprising a mainframe computer. Note that the differences between a local and a mainframe commit level mainly affect data recovery, providing the users and application programs perform atomic processes.

Procedure Management

The DWFM unit comprises the following functions for managing proper initiation and termination of procedures. The actual performance of the procedure is supported by DWFM Language expressions, application programs and other manual or computer-aided tools.

Procedure Initiation

The initiation of a procedure comprises the following steps:
1. The procedure type specifications are retrieved from the procedure type table at the current location (=performance location).
2. The authorization of the user to perform the procedure on the case is verified. If the user is authorized, then processing continues with the next step, else the initiation request is rejected and a message to that effect is returned to the user. It is assumed that the information used by the DWFM unit to build the sets of possible procedures, directives and destinations is NOT identical to the information that is used by the authorization system; the former is not as current as the latter.
3. The procedure variable pool is initiated by executing the procedure variable assignment expression which is associated with the procedure type table at the location.
4. A working copy of the un-committed copy of the case envelope is generated through the invocation of the decapsulation process.
5. The case profile is updated to show that the selected procedure is started.
6. The working copy of the case envelope is passed to the user, or an application program, for processing.

Procedure Processing

During the processing of a procedure, the user or application program may request DWFM services through the user command interface UCI or the application programming interface API respectively, including the invocation of a related procedure.

Procedure Termination

When a user or program has completed the processing of a procedure, then the DWFM must be requested to perform the procedure termination process. Upon the receipt of such a request, the DWFM performs the following steps:
1. The case profile is checked to ensure that the terminating procedure was properly initiated. If not, then the termination request is rejected and a message to that effect is returned to the user.
2. The contents of the working copy of the case envelope replaces the contents of the un-committed copy through the invocation of the encapsulation process and the working copy is subsequently discarded.
3. The case profile is updated to show that the selected procedure is terminated.

Flow Control And Location Selection

The DWFM unit provides functions for the control of the flow of cases between users, i.e., to ensure that the correct processing directive is performed on the case by the correct user at the correct time. Since a location and its users only can act on information that is available at the location, a significant factor in ensuring the progress of a case is the correct selection of where to transport it in order to make it available for processing.

Undetermined Cases

When a case lacks any significant processing directive, i.e., one where the performance qualifier evaluates to NOT-YET or SHOULD, then the case is undetermined, i.e., the DWFM unit cannot assist in the progress of case processing. For such a case, the DWFM system will imbed a special significant processing directive, a procedure that SHOULD be performed by the responsible plan destination, into the processing table of the case, and, consequently, the case will become determined. In one embodiment the case is transported to the hold location if there is at least one directive that MAY be processed. This seems like a bad strategy, since the purpose of the system is to push the case through its processing. Note that MAY directives always can be performed by the user through an explicit request.

Determined Cases

A determined case has at least one significant processing directive. In order to determine the preferred location, i.e., the location where the case should be residing in order to best further its processing, the following processing is performed by the DWFM unit at the current location, i.e., the location where the case currently exists:
1. The processing table for the case is searched for an IMMEDIATE processing directive for which the current location is a performance location and the performance qualifier is SHOULD. If found, then its action specification expression is evaluated and performed.
   This step is repeated until the complete processing table has been searched without finding any such directive, in which case the processing continues with the next step.
2. The processing table for the case is searched for all processing directives for which the current location is performance location and the performance qualifier is SHOULD. For each such directive, the related destination rules are evaluated yielding a set of possible destinations. For each such destination, the set of associated locations is added to the set of possible locations.
   Note that this set can contain duplicate elements. When all possible directives have been analyzed accordingly, the set of possible locations is compressed to contain one element for each possible location, and the locations are ranked in accordance with the number of duplicates in the original set. If the set of possible locations is empty then the next step is performed, else the current location becomes the preferred location and an action notification is sent to the highest ranked possible location.
   Action notifications may be transported to all or some subset of the remaining possible locations to make it possible for users at those available for processing. Each location is responsible to verify that the action notifications received (they are like mini-cases) can be processed by at least one user for which the location is the work location, and that is authorized for both the directive and any of the possible destinations. If so is not the case, a possible inconsistency exists between the case processing plan and the authorization specifications. The responsible plan user is notified about this situation.
3. If a preferred location is undetermined then the following processing is performed.The processing table for the case is searched for all processing directives for which the performance qualifier is SHOULD.
   For each such directive, the associated performance locations are determined and added to the set of possible locations. Note that this set can contain duplicate elements.
   When all such directives have been analyzed accordingly, the set of possible locations is compressed to contain one element for each possible location, and the locations are ranked in accordance with the number of duplicates in the original set.
   If the set of possible locations is empty then the next step is performed, else the location with the highest rank becomes the preferred location.
4. If a preferred location still is undetermined, then the above three steps are repeated with the change that we are now searching for performance qualifiers that evaluate to NOT-YET instead of SHOULD.
5. If a preferred location still is undetermined, then the set of possible locations is empty.
   Such a case is regarded as "undetermined", and the action described under that sub-heading above is taken.
   This will assign the responsible plan users work location (or the hold location) as the preferred one.
6. If the preferred location is different from the current location, then the transport procedure is initiated for the case in order to make a copy of the case available at the preferred location (see copy management for further discussion).

Related Cases And Procedures

If cases are related they are transported by the DWFM units that handle the cases to the same location, in order for them to be processed within the same consistency interval. That is, the cases are synchronized. The relations and the synchronization are specified in the control data of each case.

Case Selection

The DWFM unit comprises the following functions to support the user in selecting cases to work on.

Explicit Selection

When a user wants to work on a case, and the case identification is known, then the user may requisition the case to be made available for processing. When the case is successfully made available at the users location, or if the case already is available at that location, then the case and its processing directives for which the user is authorized are presented to the user for selection and execution. Similarly, an application program or processing directive may requisition a case to be made available for processing, and subsequently initiate the execution of a procedure.

Action Queue

When the processing table for a case indicates that a user action should be performed on the case, then the case will reside at the performance location, and action notifications will be transported to a set of locations based on the destination rules (see Flow Control And Location Selection). Subsequently, authorized users will be notified that there is work to be done on the case. Also, as described above, the user may explicitly request a given case to be made available for processing at the location.

Consequently, at a given point in time, there will be a set of cases and action notifications available for processing at the user's location, each having a profile with one or more processing directives that MAY or SHOULD be performed. The DWFM system provides functions that allow the user to query this set and produce a subset of possible cases, possible directives and possible destinations for which the user is authorized. The subset may be ordered and prioritized and is subsequently presented to the user as an action queue. The user may specify the manner in which the action queue is presented, i.e., select the kinds of information and the presentation format to be used when presenting the information which is associated with the cases, processing directives and destinations. To tailor this presentation and selection to the requirements of specific applications, the case variable pool may contain system variables which correspond to a DWFM defined naming scheme. This allows for the contents of such variable to be assigned through any of the request interfaces, and subsequently displayed in a predefined DWFM format to aid in the case selection process.

An action queue provides the user with a basis for selecting cases and directives to process. During the processing of a directive, the action queue and the user's position will be retained and will be re-displayed following the termination of the directive. The user may browse through the queue, reorder it, skip cases that he does not wish to work on currently, further divide it into multiple action queues, etc.

The DWFM action queue support provides a user with functions that closely resemble the handling and organization of documents in a paper-based environment, i.e., the sifting and sorting of incoming mail and the organization of work to be done. An action queue is the result of a query by a user; it only needs to be reasonable current. This can be taken advantage of in order to reduce processing overhead.

Copy Management

The management of distributed case data within a network of node units and locations has a profound impact on the reliability, availability and performance of case processing.

Based on the case plan, the DWFM system will automatically transport a copy of the case to the location where it is most likely to be used next. This improves the probability of the case to be available at the location when a user needs it, and reduces the risk of not getting to a case due to temporary work network malfunction.

Variable Pools

The following table indicates the different pools and their recoverability.

| Variable Pool | Recoverable | Permanent |
| --- | --- | --- |
| Location | No | Yes |
| User | No | Yes |
| Case | Yes | Yes |
| Session | No | No |
| Procedure | Yes | No |

Names and contents of variables have free form, i.e., are simply character strings. The value of a variable should be determined from its content and the manner of reference. There are a number of prior art interpreters (dBASE, EXEC, REXX, etc.) that use this method, and the pro's and con's are well understood. The inventive syntax is rather concise, which reduces the ambiguity of such "non-typed" variables. A variable manipulation language allows for generic naming, deletion, etc., to aid in construction of arrays, tables, lists etc.(see also appendix A).

DESCRIPTION OF A SCENARIO ACCORDING TO AN EMBODIMENT OF THE INVENTION

This chapter the invention will be further explained by the description of a scenario of work flow and case handling according to the inventive method and by means of an embodiment of the inventive arrangement. The case described in this scenario is a credit application.

In this example, the components comprised in the DWFM arrangement and available to developer of an application are:
A Variable Pool Manager
Naming convention of variables.
Request Interface through which users and programs get access to the functionality of the DWFM components.
A procedural language which supports the processing directive expressions.
A Case Flow Manager.
A Transport Manager which reliably transfers cases between locations.

Envelope Services.

External Process support functions comprised in the application/external component unit (30).

A Presentation Manager.

Variable Pool Manager (VPM)

The Variable Pool Manager (VPM) implements the support for the DWFM variable pool functions and provides the functions of a field oriented, free form "Data Base" for a DWFM location.

The VPM provides the following items and functions:

Structured names

Storage space management

Variable value assignment and retrieval

Data recovery

Consistency interval management

Data transportability

Self-defining data

Naming Convention For Variables

The Variable Pool Manager (VPM) component of the DWFM arrangement supports a basic data model. A "variable" is a name-value pair where the name is a syntactically structured string and the value is an unstructured array and to this pair there is an associated attribute value. The Variable Pool Manager is aware of the structure of the name string and the attribute. If the attribute indicates that the value has one of a number of predefined forms then the Variable Pool Manger may perform transformations of the value, e.g., if the value is a character array, then the VPM performs character set transformations (Personal Computer PC vs. mainframe). Otherwise, the VPM is unaware of any internal structure of the value array. The variables (name-value pairs) are stored in one or more, physically separate variable pool(s) that may be temporary or permanent, protected or unprotected, shared or private.

The variable names are composed of a sequence of name component strings delimited by periods ("."). In the inventive method, a particular naming scheme is executed to address variables used by the applications and by the DWFM arrangement.

DWFM Request Interface

The request interface is the means by which DWFM procedures, application programs, and end-users may obtain DWFM services.

The DWFM Procedural Language

This language is in this embodiment an implementation of REXX and allows for non-complex work flow applications to be implemented quickly and easily.

The language provides:

Free form syntax with in-line comments

Manipulation of variables in the DWFM variable pools

Assignment of attributes to variables

Pre-defined and user defined functions

Structured programming constructs

Recursive process execution

Invocation of external processes

The functions covered by the procedural language are rich enough to perform a large amount of normal case management processing. To perform very intricate or complicated processing the use of an application program is recommended.

The language is simple enough that a non-programmer with some data processing ability should be able to automate fairly trivial operations. This automation can be done without the aid of central application programming staff thus allowing autonomy and increased productivity for the local offices.

The Case Flow Manager

The case flow manager performs the following functions:

Identifies the processing directives that should be performed for a given case.

Automatically executes non-user related directives.

Decides to which location a given case should be transported.

Notifies users of actions to be performed.

This facility evaluates the performance prerequisite for each processing directive in a case and, based on the resulting state value, determines which processing directives will advance the cause of the case.

This case evaluation is performed when the processing of a processing directive has completed and on a time interval basis. The re-evaluation of the case after processing directive completion allows re-execution of previously executed directives if the state of the case and the performance prerequisites allow for it.

Complete re-evaluation allows a simpler processing directive syntax since no function is needed to "un-mark" a directive that has been "marked" as processed and, due to new developments in the case, must be re-executed.

This evaluation produces a list of directives that 'SHOULD' be performed. If no directives can be performed at the current location, the case is sent to a location where one of the 'SHOULD' directives can be performed.

When the case is at an appropriate work location, Action Notifications are sent to the users that are capable of performing the 'SHOULD' directives.

Reliable Transport Manager

This facility takes responsibility for a case until it is safely transmitted to the requested location.

It will interact with the data communication manager at the location, (e.g. the Communication Manager component of an OS/2 system), and with its counterparts at other LAN and mainframe locations.

The Transaction Queue Management of the co-pending PCT-application No. PCT/FE 94/00172 (TQM) is an example of an arrangement that provides these functions.

The Envelope Services (ES)

In manual or paper-based systems, a case usually consists of a folder containing a number of documents and disparate pieces of paper. The DWFM Envelope Services (ES) component provides functions that closely resemble such a case folder for digital documents. Most information that can be stored in a paper system can be accommodated by the Envelope Services and the data which it stores is more easily located and shared.

The envelope services provide for the transformation of data between different storage forms and preferred user presentation forms (n.b. user=person, application or PC tool).

The envelope is used to hold case related application data that is not stored in the variable pool. Some examples:

A Lotus 1-2-3 spreadsheet.

The text output of a 3270 based mainframe application. This data would be captured from the 3270 buffer at the PC and converted to a text file.

Notes on the case entered via a text processor, e.g., Word Perfect.

Scanned images, voice messages etc.

Notes on the location and contents of documents that reside outside the system.

External Process Support

The DWFM External Process Support functions, executes a standardized method to invoke and interact with "foreign" programs, i.e., application programs implemented in any programming language or general PC tools, e.g. Lotus 1-2-3.

For example, a PC program may be invoked from the DWFM system. The PC program invoked need know nothing of the DWFM environment. One example of how this could be used is:

1. Envelope Services extracts a spreadsheet from the case envelope.
2. The DWFM unit checkpoints its environment.
3. If needed, the DWFM unit sets up a PC partition for Lotus 1-2-3.
4. Lotus 1-2-3- is invoked and passed the name of the spreadsheet to use.
5. The end user works with the spreadsheet.
6. The end user saves the spreadsheet and exits 1-2-3.
7. The DWFM unit regains control.
8. Envelope Services encodes the resulting spreadsheet into the case envelope.
9. The procedure terminates.

In this example, the invocation of the spreadsheet tool is completely automatic and appears seamless to the user. Also the data used (the spreadsheet) is immediately re-captured in the case envelope and is ready to be transported to another location. The only requirement of the PC program (Lotus 1-2-3) is that it may be loaded and will terminate as a normal program.

In order to ensure robust operations, the DWFM unit takes a checkpoint prior to invoking the PC program. If it does not complete normally (or power fails), the DWFM unit will clean up the environment and restore the case to the status of the checkpoint.

The Presentation Manager

The DWFM arrangement comprises a presentation manager which uses the basic operating system facilities to implement simple interactions with the user in accordance with installation standards, i.e., SAA CUA.

The Dialog Manager is integrated with the DWFM Procedural Language and the variable Pool Manager to allow for easy invocation, data exchange and verification.

DETAILED DESCRIPTION OF A SCENARIO ACCORDING TO AN EMBODIMENT OF THE INVENTION

Overview

The scenario describes an application for credit approval using a lien on real estate property as collateral. The approval process consists of twelve user actions, several of which can be repeated, and one immediate action to take care of missed appointments.

The credit approval process is divided in two main parts. The first part involves checks on the credit worthiness of the applicant. If these tests are passed, the terms of the credit are discussed with the client. If these terms are agreed upon, the second part of the process is the verification of the collateral. If both parts pass muster, and the amount is within the local office's credit authority, the credit is approved. If the amount exceeds the local office's authority, the credit is referred to a central credit committee for final approval or rejection.

An additional step is added to the process. When the credit is approved and payment is disbursed, it is assumed that additional data bases at the central site must be updated.

The credit application process is divided into the following actions:

1. Credit Application Registration

This action is performed once and includes the creation of a credit application case and the completion of credit application information.

We will assume that case creation occurs at the local office.

The loan officer, via a dialogue manager, which is a tool developed for this situation, invokes the "Credit Application Registration" operation. The operation collects all pertinent information and creates a credit application case through a request to the DWFM Application Programming Interface (API). When the operation completes, the action is committed and the credit application case now competes with all other cases for attention and resources.

The result of this action is:

1=new credit application is registered.

2. Collection of Credit Information

This action is performed locally and can be repeated a number of times. It entails the collection of different kinds of customer credit information from the local branch office, the central IMS system and from external sources.

The loan officer is notified that the action must be performed on the case through the DWFM Action Notification facility. Upon selecting the case for processing, the user is presented a menu that allows the invocation of Credit Information Request operations and the review of credit information already gathered for the case.

The Credit Information Request operations interact with a central mainframe DB/DC system, and work in a similar fashion although the actual DB/DC system transaction executed is different. Each operation consists of three steps:

1. Log-on to the DB/DC system

This can be a manual step if the installation does not allow automatic log-on. It is omitted if the user is already logged-on to the DB/DC system.

2. Issue the DB/DC system transaction via 3270 Terminal Emulation.

This step is performed automatically upon successful completion of the log-on step. It issues the appropriate DB/DC system transaction and copies the response screen to a file or parses the screen and adds the information to the case variable pool.

3. If the screen was stored as a file in the previous step, then it is added to the case envelope.

Thus, the DWFM facilities replaces the paper documents of the application with corresponding entries in the case variable pool or envelope. And it may be achieved using existing DB/DC system transactions.

The action is repeated until enough information has been gathered to decide the feasibility of a credit to the customer.

The results of this action are:

0=more information is needed.

1=credit information is complete.

3. Schedule Appointment With Customer

This action uses a general Appointment Handler facility to set up and register an appointment with the customer for the purpose of discussing the current state of the credit application and possible continued processing of it.

Since it would be a frequent activity to contact customers for the purpose of presenting info or setting up appointments a general purpose Appointment Handler may be developed. This facility would allow customer addresses and phone numbers to be easily retrieved, letters to be generated, calendar functions to be accessed, appointment schedules to be maintained and reminders to be generated.

This action is usually performed as an extension of action 2 above. If not, then the user is notified of the need to perform the action through the DWFM Action Notification facility.

The result of this action is:

0=appointment not set up.

1=appointment is set up.

4. Presentation and Selection of Credit Terms

This action is performed when a loan officer has established contact with the customer, either in person or through telephone. It entails the presentation of the outcome of the credit check, and, if feasible, the discussion and selection of credit terms.

At this point, the bank or the customer may decide that the processing of the credit application should be terminated, in which situation the case is terminated and the information discarded. Else, the application process is continued and the collateral is specified.

The user selects this action from a menu when the customer has been contacted.

The results of this action are:
1=re-performed credit check.
2=re-schedule appointment.
3=terms agreed, collateral is specified.
4=cancel credit application.

5. Processing of Collateral

This action entails the gathering and registration of information on the collateral for the credit. It involves inquiries to central and external sources of information, some of them manual processes. The inquiries are implemented in much the same fashion as the ones in action 2.

The user is notified that the action must be performed on the case through the DWFM Action Notification facility. Upon selecting the case for processing, the user will be presented a menu that allows the invocation of Collateral Information Request operations and the review of collateral information already gathered for the case.

The action is repeated until proper results have been obtained.

The results of this action are:
0=more information is needed.
1=re-perform credit check.
2=schedule appointment with customer.
3=re-specify credit terms or collateral.
4=collateral process is complete.

6. Amount-Dependent Approval

When the collateral has been processed, the appropriate personnel at the local office may decide on the acceptability of the credit. The local office is limited in the amount of credit it can grant for a single credit. If this credit is below that limit, then it may be approved immediately. If the amount is above the limit, the case must be sent to a central credit committee for final approval or rejection.

The appropriate user is notified that the action must be performed on the case through the DWFM Action Notification facility. Upon selecting the Loan Approval operation, the user is presented with a menu that allows for review of the information in the application, and the registration of a decision to approve, reject or re-process the application.

The result of this action is:
0=decision not completed.
1=decision is registered.

7. Review Approval Decision

This action is performed when the approval decision has been made. Depending on the outcome of the decision, the loan officer will either contact the customer for an appointment, or re-process one or more of the information-gathering actions.

The results of this action are:
1=re-perform credit check.
2=schedule appointment with customer for re-process
3=re-specify credit terms or collateral.
4=schedule final appointment with customer.

8. Schedule Final Appointment With Customer

This step uses the general Appointment Handler facility to set up and register an appointment with the customer for the purpose of informing on the final approval or denial of the credit application.

This action is usually performed as an extension of action 7 above. If not, then the user is notified of the need to perform the action through the DWFM Action Notification facility.

The result of this action is:
0=appointment not set up.
1=appointment is set up.

9. Presentation and Establishment of Credit

This action is performed by the loan officer when contact with the customer is established. It entails the presentation of the outcome of the final credit approval process, and, if the credit is accepted, results in the signing of credit documents and the disbursal of funds to the customer.

At this point, the bank or the customer may decide that the credit terms or collateral specifications should be changed. If so, some of the previous actions are re-executed and the credit application process continues from there.

If the credit is accepted and approved by all parties, then the appropriate credit documents are drafted and signed, and the funds disbursed to the customer.

The results of this action are:
1=re-specify credit terms or collateral.
2=credit is established.
3=cancel credit application.

10. Local Credit Registration

The established credit is registered at the branch and the appropriate application information is archived.

This action is usually performed as an extension of step 9 above, but may be deferred, in which case the user is notified on the need to perform it through the DWFM Action Notification facility.

The result of this action is:
0=local archiving not completed.
1=application and credit information is archived.

11. Central Credit Registration

This action is executed at the central office and entails the registration of the credit in the central credit data base for payment scheduling and monitoring, and possibly the invocation of various other DB/DC system transactions to add the credit information to the necessary data bases for recurrent credit processing. Note, that this portion of the work flow is not part of this scenario.

The result of this action is:
1=credit registered centrally.

12. Termination of Credit Application Case

When the credit is properly registered, locally and centrally, the application process is finished.

The case is terminated, and all remaining information is discarded.

The result of this action is:
1=application processing is completed.

13. Re-schedule Appointment

To make the scenario complete, one additional action is required to handle the situation when a customer appointment does not occur as planned.

The action will result in the appropriate appointment scheduling step to be re initiated and the user notified that a new appointment must be set up.

The result of this action is:
1=Re-schedule appointment.

Scenario Implementation

The object of this section of the document is to show how an application developer would implement the credit application cenario. A large portion of the actual work could be implemented in the DWFM procedural language, however this has not bee done so that the format of the processing directives and their inter-relationships are shown more clearly.

Processing Table For Credit Application Case

The following process directives are contained in the processing table of a credit application case.

The numbering and naming corresponds to the numbering of the corresponding action in the preceding scenario overview.

1. (Does not exist)

Directive 1 does not exist since action 1 is initiated directly by the user and consists of the creation of the case.

However, the program that registers the credit application sets up a number of case variables following the creation of the case. Among others, the variabe "C.0LOAN_OFFICER" will contain the destination name of the loan officer that handles the case and "C.0AMOUNT" will contain the requested loan amount. The variable "C.0STATE" is used by the directives as a state variable and it is initialized with the value "ALPHA".

2. Processing Directive Name: act2

| Variable name | Contents |
|---|---|
| Description: pd.act2.desc | "Collect Credit Info" |
| Perf. Loc.: pd.act2.loc | |
| Perf. Qual.: pd.act2.qual | /* see next lines */ |
| IF c.state == "ALPHA" | |
| THEN RETURN "SHOULD" | |
| ELSE RETURN "CANNOT" | |
| Perf. Mode: pd.act2.mode | "USER" |
| Perf. Auth.: pd.act2.auth | |
| Dest. Rule: pd.act2.dest | C.0LOAN_OFFICER |
| Action Spec.: pd.act2.act | /* see next lines */ |
| CALL new_loan.collect_credit_info | |
| SELECT | |
| WHEN RESULT == 1 | |
| THEN C.0STATE = "BETA" | |
| OTHERWISE NOP /* don't change state */ | |
| END | |

3. Processing Directive Name: act3

| Variable name | Contents |
|---|---|
| Description: pd.act3.desc | "Schedule first appointment" |
| Perf. Loc.: pd.act3.loc | |
| Perf. Qual.: pd.act3.qual | /* see next lines */ |
| IF C.0STATE == "BETA" | |
| THEN RETURN "SHOULD" | |
| ELSE RETURN "CANNOT" | |
| Perf. Mode: pd.act2.mode | "USER" |
| Perf. Auth.: pd.act3.auth | |
| Dest. Rule: pd.act3.dest | C.0LOAN_OFFICER |
| Action Spec.: pd.act3.act | /* see next lines */ |
| CALL new_loan.sched_appointment | |
| /* A result of the action is that the date of the appointment is stored in the variable "C.0APPT_DATE" */. | |
| SELECT | |
| WHEN result == 1 | |
| THEN C.0STATE = "DELTA" | |
| OTHERWISE NOP /* don't change state */ | |
| END | |

4. Processing Directive Name: act4

| Variable name | Contents |
|---|---|
| Description: pd.act4.desc | "Present/select terms" |
| Perf. Loc.: pd.act4.loc | |
| Perf. Qual.: pd.act3.qual | /* see next lines */ |
| IF C.0STATE == "BETA" \| C.0STATE == "DELTA" | |
| THEN RETURN "MAY" | |
| ELSE RETURN "CANNOT" | |
| Perf. Mode: pd.act4.mode | "USER" |
| Perf. Auth.: pd.act4.auth | |
| Dest. Rule: pd.act4.dest | C.0LOAN_OFFICER |
| Action Spec.: pd.act4.act | /* see next lines*/ |
| CALL new_loan.present_terms | |
| SELECT | |
| WHEN result == 1 | |
| THEN C.0STATE = "ALPHA" | |
| WHEN result == 2 | |
| THEN C.0STATE "BETA" | |
| WHEN result == 3 | |
| THEN C.0STATE = "GAMMA" | |
| WHEN result == 4 | |
| THEN C.0STATE = "TERMINATE" | |
| OTHERWISE NOP /* don't change state*/ | |
| END | |

The loan amount in "C.0AMOUNT" may be changed by this action.

5. Processing Directive Name: act5

| Variable name | Contents |
|---|---|
| Description: pd.act5.desc | "Collect collateral info" |
| Perf. Loc.: pd.act5.loc | |
| Perf. Qual.: pd.act5.qual | /* see next lines */ |
| IF C.0STATE == "GAMMA" | |
| THEN RETURN "SHOULD" | |
| THEN RETURN "CANNOT" | |
| Perf. Mode: pd.act5.mode | "USER" |
| Perf. Auth.: pd.act.5.auth | |
| Dest. Rule: pd.act5.dest | C.0LOAN_OFFICER |
| Action Spec.: pd.act5.act | /* see next lines */ |
| CALL new_loan.verify.collateral | |
| SELECT | |
| WHEN result == 1 | |
| THEN C.0STATE = "ALPHA" | |
| WHEN result == 2 | |
| THEN C.0STATE = "BETA" | |
| WHEN result == 3 | |
| THEN C.0STATE = "DELTA" | |
| WHEN result == 4 | |
| THEN C.0STATE = "EPSILON" | |
| OTHERWISE NOP /*don't change state */ | |
| END | |

6. Processing Directive Name: act6

This directive guides the case to a bank official who is authorized to approve the credit based on the requested amount. We have here assumed that the variable "U.0LOAN.AMOUNT_LIMIT" contains the limit amount that the user may approve. Loans of higher amounts are directed to the destination "spec_loan_approvals"

| Variable name | Contents |
|---|---|
| Description: pd.act6.desc | "Loan Approval" |
| Perf. Loc.: pd.act6.loc | |
| Perf. Qual.: pd.act6.qual | /* see next lines */ |
| IF C.0STATE == "EPSILON" | |
| THEN RETURN "SHOULD" | |
| ELSE RETURN "CANNOT" | |
| Perf. Mode: pd.act6.mode | "USER" |

-continued

| Variable name | Contents |
|---|---|
| Perf. Auth.: pd.act6.auth | |
| Perf. Rule: pd.act6.dest | /* see next lines*/ |
| | IF C.OAMOUNT >U.OLOAN.AMOUNT_LIMIT |
| | THEN RETURN "spec_loan_approvals" |
| | ELSE RETURN C.OLOAN_OFFICER |
| | /* when this rule is evaluated it will |
| | return either the local or the |
| | central location as the destination |
| | */ |
| Action Spec.: pc.act6.act | /*see next lines */ |
| | CALL VAR L.appl.new_loan.approval |
| | /* n.b. causes a location dependent |
| | procedure to be performed */ |
| | SELECT |
| | WHEN result == 1 |
| | THEN C.OSTATE = "PHI" |
| | OTHERWISE NOP /* don't change state */ |
| | END |

7. Processing Directive Name: act7

| Variable name | Contents |
|---|---|
| Description: pd.act7.desc | "Review approval decision" |
| Perf. Loc.: pd.act7.loc | |
| Perf. Qual.: pc.act7.qual | /* see next lines */ |
| | IF C.OSTATE == "PHI" |
| | THEN RETURN "SHOULD" |
| | ELSE RETURN "CANNOT" |
| Perf. Mode: pd.act7.mode | "USER" |
| Perf. Auth.: pd.act7.auth | |
| Dest. Rule: pd.act7.dest | C.OLOAN_OFFICER |
| Action Spec.: pc.act 7.act | /* see next lines*/ |
| | CALL new_loan.approval_review |
| | SELECT |
| | WHEN result == 1 |
| | THEN C.OSTATE = "ALPHA" |
| | WHEN result == 2 |
| | THEN C.OSTATE = "BETA" |
| | WHEN result == 3 |
| | THEN C.OSTATE = "DELTA" |
| | WHEN result == 4 |
| | THEN C.OSTATE = "IOTA" |
| | OTHERWISE NOP /* don't change state */ |
| | END |

8. Processing Directive Name: act8

| Variable name | Contents |
|---|---|
| Description: pd.act8.desc | "Schedule final appointment" |
| Perf. Loc.: pd.act8.loc | |
| Perf. Qual: pd.act8.qual | /* see next lines */ |
| | IF C.OSTATE = "IOTA" |
| | THEN RETURN "SHOULD" |
| | ELSE RETURN "CANNOT" |
| Perf. Mode: pd.act8.mode | "USER" |
| Perf. Auth: pd.act8.auth | |
| Dest. Rule: pd.act8.dest | C.OLOAN_OFFICER |
| Action Spec.: pd.act8.act | /* see next lines */ |
| | CALL new_loan.sched_appointment |
| | /* A result of the action is that the date of the appointment is stored in the variable "C.OAPPT_DATE */ |
| | SELECT |
| | WHEN result == 1 |
| | THEN C.OSTATE = "KAPPA" |
| | OTHERWISE NOP /* don't change state */ |
| | END |

9. Processing Directive Name: act9

| Variable name | Contents |
|---|---|
| Description: pd.act9.desc | "Establish loan" |
| Perf. Loc.: pd.act9.loc | |
| Perf. Qual.: pd.act9.qaul | /* see next lines */ |
| | IF C.OSTATE = "IOTA" \| C.OSTATE = "KAPPA" |
| | THEN RETURN "MAY" |
| | ELSE RETURN "CANNOT" |
| Perf. Mode: pd.act9.mode | "USER" |
| Perf. Auth.: pd.act9.auth | |
| Dest. Rule: pd.act9.dest | C.OLOAN_OFFICER |
| Action Spec.: pd.act9.act | /* see next lines */ |
| | CALL new_loan.establish_loan |
| | SELECT |
| | WHEN result == 1 |
| | THEN C.OSTATE = "DELTA" |
| | WHEN result == 2 |
| | THEN C.OSTATE = "OMEGA" |
| | WHEN result == 3 |
| | THEN C.OSTATE = "TERMINATE" |
| | OTHERWISE NOP /* don't change state*/ |
| | END |

10. Processing Directive Name: act10

| Variable name | Contents |
|---|---|
| Description: pd.act10.desc | "Local loan registration" |
| Perf. Loc: pd.act10.loc | |
| Perf. Qual.: pd.act10.qual | /* see next lines */ |
| | IF C.OSTATE = "OMEGA" \| C.OSTATE = "SIGMA" |
| | THEN RETURN "SHOULD" |
| | ELSE RETURN "CANNOT" |
| | /* this directive can be performed in "parallel" with act11 */ |
| Perf. Mode: pd.act10.mode | "USER" |
| Perf. Auth.: pd.act10.auth | |
| Dest. Rule: pd.act10.dest | C.OLOAN_OFFICER |
| Action Spec.: pd.act10.act | /* see next lines */ |
| | CALL VAR L.appl.new_loan.local_reg |
| | /* n.b. causes a location dependent procedure to be performed */ |
| | SELECT |
| | WHEN result == 1 |
| | THEN IF C.OSTATE == "SIGMA" |
| | THEN C.OSTATE = "TERMINATE" |
| | /* all processing is completed */ |
| | ELSE C.OSTATE = "THETA" |
| | OTHERWISE NOP /* don't change state*/ |
| | END |

11. Processing Directive Name: act11

| Variable name | Contents |
|---|---|
| Description: pd.act11.desc | "Central loan registration" |
| Perf.Loc.: pd.act11.loc | |
| Perf.Qual.: pd.act11.qual | /* see next lines */ |
| | IF C.OSTATE = "OMEGA" \| C.OSTATE = "THETA" |
| | THEN RETURN "SHOULD" |
| | ELSE RETURN "CANNOT" |
| | /* this derective can be performed in "parallell" with act10 */ |
| Perf.Mode: pd.act11.mode | "IMMEDIATE" |

-continued

| Variable name | Contents |
|---|---|
| Perf.Auth.: pd.act11.auth | |
| Dest.Rule: pd.act11.dest | "loan_center" |
| Action Spec.: pd.act11.act | /* see next lines */ |
| CALL new_loan.central_reg | |
| /* n.b. we assume that this is an | |
| "immediate" action */ | |
| SELECT | |
| WHEN result == 1 | |
| THEN IF C.OSTATE == "THETA" | |
| THEN C.OSTATE = "TERMINATE" | |
| THEN C.OSTATE = "TERMINATE" | |
| /* all processing is completed */ | |
| ELSE C.OSTATE = "SIGMA" | |
| OTHERWISE NOP /* don't change state */ | |
| END | |

12. Processing Directive Name: act12

| Variable name | Contents |
|---|---|
| Description: pd.act12.desc | "Terminate application" |
| Perf. Loc.: pd.act12.loc | |
| Perf. Qual.: pd.act12.qual | /* see next lines */ |
| IF C.OSTATE = "TERMINATE" | |
| THEN RTURN "SHOULD" | |
| ELSE RETURN "CANNOT" | |
| /* this derective cannot be performed | |
| until act10 & act11 are completed */ | |
| Perf. Mode: pd.act12.mode | "IMMEDIATE" |
| Perf. Auth.: pd.act12.auth | |
| Dest. Rule: pd.act12.dest | C.OLOAN_OFFICER |
| Action Spec.: pd.act12.act | /* see next lines */ |
| CALL VAR L.appl.new_loan.terminate_case | |
| /* n.b. causes a location dependent | |
| procedure to be performed */ | |
| SELECT | |
| WHEN result == 1 | |
| THEN CALL TERMINATE CASE | |
| /* terminate current case */ | |
| OTHERWISE NOP /* don't change state */ | |
| END | |
| /* Credit application case is terminated | |
| following the conclusion of this | |
| processing directive */ | |

13. Processing Directive Name: act13

| Variable name | Contents |
|---|---|
| Description: pd.act13.desc | "Re-schedule appointment" |
| Perf. Loc.: pd.act13.loc | |
| Perf. Qual.: pd.act13.qual | /* see next lines */ |
| IF C.OSTAT == "DELTA" \|C.OSTATE="KAPPA" | |
| THEN IF DATE() > C.OAPPT_DATE | |
| THEN RETURN "SHOULD" | |
| ELSE RETURN "NOT_YET" C.OAPPT_DATE +1 | |
| ELSE RETURN "CANNOT" | |
| Perf. Mode: pd.act13.mode | "IMMEDIATE" |
| Perf. Auth.: pd.act13.auth | |
| Perf. Rule: pd.act13.dest | |
| Action Spec.: pd.act13.act | /* see next lines */ |
| /* Note that this action doesn't require | |
| any application program */ | |
| IF C.OSTATE == "DELTA" | |
| THEN C.OSTATE = "BETA" | |
| THEN C.OSTATE = "IOTA" | |

Appendix A

Action specification (See Performance directive) A specification of processing that is to be performed. An action specification that requires user intervention, i.e. performance mode User, is called a user action. Action specifications specify the operations and the code that execute an atomic procedure.

Action specification expression (See Performance directive) A set of statements which may conditionally access and assign values to variables in different variable pools and execute valid DWFM requests. Examples of DWFM requests are: perform a procedure type, create a case, transport a case, terminate a case, terminate directive processing with commit or back-out, etc. See DWFM Request Interfaces in the description.

Action notification A uniquely named entity that contains information on a given user action that should be performed and that is addressed to a given destination. Action notifications indicate that there is work to do. If, when selected by a notified user, the corresponding action is already taken, the flow control and procedure management functions detect that fact, and not consistency or integrity exposure exists.

Consequently, the distributed action notifications are kept as current as possible without incurring unreasonable costs (added overhead, reduced availability, etc). In one embodiment this means sending a message to the locations where action notifications may reside which should be discarded, and, if a message does not get successfully processed, no harm is done.

Action list A list of action notifications stored at a location in a node unit.

Associated case list (See Performance directive) An expression that produces a set of valid case names. The names refer to cases that will be requisitioned and available for processing when the associated action specification is executed.

Atomic An atomic operation is indivisible. A transaction should be atomic, which means that it either is executed in its entirety or is totally cancelled. A sequence of operations that is fundamentally not atomic can be made to look as if it really were atomic from an external point of view. The procedures and processes operating on a case are atomic.

Authorization Steps within the inventive method used to determine the procedure types and processing directives that a given user may perform and the destinations that a given user may access. Note that the DWFM unit executing the inventive method only determines whether a user may perform a procedure or access a destination. The DWFM unit is not responsible for the case envelope contents.

Authorization expression See also Destination An expression that is evaluated to True if the current user is authorized to process or access the associated object.

Authorization expression An expression that is evaluated to true if the current user is authorized to process or access the associated object.

Case state value The current state value of a case determines the state that the case is currently in, and which is assigned to the case as a step of the directives and external processes on the case. A case type specifies two case state values: an initial state value, which is assigned to the current case state for a newly created case, and a final case state value, which, when assigned to the current case state for a given case, indicates that the processing of a case is terminated. The case state values are comprised in the case variable pool.

Case In the present application a case is a digital counterpart to a paper document. A case may comprise a formal document, e.g. an original document, associated documents, forms, notes etc. A case may be processed by different users at different times, and if it comprises more documents than one original document, it is divisible and can be processed simultaneously at the same or at different locations. A case belongs to a given case type, and is uniquely named. A case comprises two kinds of information: an envelope and a profile.

Case processing plan A plan for the processing of a case set out in the control data of the case. Such a case processing plan may be defined for a case type or for an individual case.

Case type table A table of case type specifications which is stored in a node unit in connection to a location. The table contains specifications for the case types that may be created at the location.

Case type Category of cases and associated processing rules and instructions. There are three sets of information associated with a case type: envelope, profile and variable assignment expression.

Case type envelope A case type envelope is defined for each case type. It contains information that applies to all cases within the case category, e.g. data that describes blank forms, standard texts, instructions, etc. The case type specifies a set of named processes for encapsulation and decapsulation of envelope data, i.e. transformation of data between the case envelope format and data format (e.g. files, database records, etc.) preferred by the user.

Case list A list of cases which is stored in a node unit in connection to a location. The list contains the cases that reside at the location, i.e. the cases for which the location is the current location. It also contains the cases that are being transported (to and ?) from the location. Further, if the location or node unit is dependent on a coordinating node unit or location it contains an ELSE entry, which specifies the location where other cases or information on cases coordinated by the coordinating node unit or location can be found.

Case envelope Each case comprise a case envelope. The case envelope contains the application data or user data part of a case, i.e. information that applies to a specific case, such as documents, filled in forms, individualized texts, notes, memos, etc. The contents of an envelope is not interpreted within the inventive method. The inventive method and the DWFM arrangement provides functions that assist a user in manipulating component parts of a case envelope and in correctly handling a case envelope when transporting a case between node units, locations and external processes. The application and its users bear responsibility for maintaining the internal consistency of an envelope, i.e. to correctly define, structure, store, handle and retrieve the information that belongs in the envelope.

Case sharing rule expression (See Performance directive) A logical expression that determines if the associated action may be executed at this time based on the case sharing rules. The case sharing rules concern concurrent execution of multiple processes for a given case. This involves issues of how the case data is stored (shared or copies); if shared, how long lasting lock-out can be avoided; if copies, how the results may be merged after the conclusion.

Case sharing rule (See Performance directive) A specification of the rules that govern whether the associated action may be executed concurrently with other ongoing actions for a case.

Case profile Each case comprise and each case type is associated with a case profile. The case profile contains control data for a case, i.e. data used to guide and control the processing of a case. The case profile contain Case state A set of information characterizing or specifying the condition of a given case or case type. A case of a given type may assume one of a set of a set of predefined state values that correspond to the processing or refinement that the case has undergone. The completion of a procedure of a given type on a case will leave it in a defined state.

COMMIT A COMMIT operation signals successful end-of-transaction. It tells the transaction manager that a logical unit of work has been successfully completed, and that all of the updates made by that unit of work can now be "committed" or made permanent. C.f. ROLLBACK.

Consistency interval An atomic processing unit within a work session. Changes to case data and case variable pools made by requests through a DWFM request interface during the consistency interval will be either committed or roll-backed (un-done).

DBMS Database Management System.

Destination A uniquely named entity that is associated to a set of locations and a set of authorized users, i.e. users that are authorized to that destination location. A destination corresponds to a prior art mail box to which cases, action notifications, etc. can be addressed and transported, and that can be accessed only by authorized users, i.e. messages residing at the destination can be processed only by users with authorization for the given destination. To a destination is associated an authorization expression for the destination.

Destination rule (See Performance directive) A specification of destinations where action notifications should be sent.

Destination table A destination table is a table of destination specifications which is stored in connection to a location. Each entry in the table specifies a destination name and a set of associated location names. There are two special entries in a destination table at a given location: firstly the ANY entry which specifies a destination that is associated to the given location and that any user is authorized to access, and secondly the ELSE entry which specifies a coordinating location where information on other destinations can be found.

Destination rule expression (See Performance directive) An expression that produces a set of valid destination names.

DWFM Abbreviation for distributed work flow management. In the present application this abbreviation is often used in word compounds that describe steps comprised in the inventive method or components comprised in the inventive arrangement, i.e. the DWFM arrangement.

DWFM Commands

DWFM procedure A process which may comprise performing a work session, a processing directive or an external process. A DWFM procedure is atomic. To each procedure is associated a procedure variable pool. A well formed procedure processed in a node unit in general operates on information within one case, i.e. it is an intra-case procedure. In a node unit comprising a database manager that provides a high level of support for data integrity and consistency, a DWFM procedure may also utilize the database manager and operate on information within a database. Well formed procedures may be related to each other.

DWFM request interface A component comprised in the DWFM arrangement, which allows for users and application programs to make use of parts of the inventive method carried out by said DWFM arrangement. Preferably, three DWFM request interfaces are provided, namely a user command interface (UCI), a processing directive interface (PDI) and a application programming interface (API).

External process A process performed outside the scope of the inventive method and as such independent of the DWFM arrangement. An external process may be executed in a node unit in the DWFM arrangement, but is then governed according to other methods than the method according to the invention. An external process is, however, invoked as a DWFM procedure. The procedure type entry for an external process defines the steps necessary to perform said external process. In addition, the external process may utilize steps comprised in the inventive method or functional units of the DWFM arrangement. An example of an external process is the invocation of the application program Lotus 1-2-3, including such steps as decapsulating the 1-2-3 model prior to invoking the program and encapsulating it when the user is finished.

Identification Steps within the inventive method used to determine the identity of a user.

Inconsistency Suppose that a data item is represented by two distinct copies in the memory of a database and the DBMS is not aware of this duplication (i.e. redundancy is not controlled) then there will be some occasions on which the two entries will not agree, namely when one and only one of the two entries is updated. At such times the database is said to be inconsistent, and it is capable of supplying incorrect or contradictory information. The management of consistency in database managers is executed through the transaction or recovery scope mechanism.

Integrity The problem of integrity is the problem of ensuring that the data in the database is accurate. Inconsistency is an example of lack of integrity. The management of integrity is implemented in locking managers in a database managing system.

Internal process A process performed according to the inventive method and/or by means of the DWFM arrangement.

Location A location is a uniquely named entity in a node unit within a DWFM arrangement corresponding to the functional components that execute the inventive method, whereby communication can be performed between a first location and a second location, i.e. inter-location communication. The data processing of a given location is autonomous to a given node unit. A node unit may comprise multiple locations. Each location is associated with a specific location variable pool.

Performance mode (See Performance directive) The performance mode indicates the manner in which the action specification of a given processing directive can be performed. The mode may have one of the following values:

USER→requires interaction with a user to execute properly,

IMMEDIATE→can be executed without interaction with a user,

NOT_EXECUTABLE→the directive has failed while executing.

AUTOMATIC→indicates that the directive specifies different paths of execution, some requiring user interaction and others not. The directive may be executed as Immediate mode, and if a user interaction is required, the mode specification is temporarily changed to User.

Performance mode expression (See Performance directive) An expression that will produce a valid performance mode value.

Performance location (See Performance directive) A location where a given directive can be evaluated and executed.

Performance qualification (See Performance directive) A statement about the action specification of a given processing directive as to when it should be performed and when the case processing plan (?) should be re-evaluated, also called performability in this application. The performance qualification may comprise the following four parts:

QUALIFIER—specifies the performability of the action specification of a given processing directive. The qualifier may have one of the following values:

NEVER—This directive can never be performed and may be regarded as not part of the processing plan.

CANNOT—This directive cannot be performed.

NOT_YET—This directive cannot be performed at this time. It will at some later time evaluate to Should.

SHOULD—This directive should be performed. A directive that is associated to a performance qualifier with value Not_yet or Should is defined as a significant processing directive.

Re-evaluation time—specifies the time at which the processing plan of a case should be re-evaluated. This value is significant only when the qualifier is Cannot, Not_yet, May or Should. This time may be e.g. be specified as:

AT_COMMIT—specifies that the case should be reevaluated following the commit of the execution of an action specification expression for the case. This is the default value.

Time specification—specifies that the processing plan of a case should be re-evaluated at the given time. A Not_yet qualifier must be associated with a specific re-evaluation time, it can not have the value At_commit.

Early start time—specifies the time at which it will begin to be prompted for the performance of the action specification. This value is significant only when the qualifier is Should. The default value for this component is Time of evaluation which is registered each time a case is evaluated.

Late finish time—specifies the time at which the performance of the action specification of a case is overdue. This value is significant only when the qualifier is Should. The default value is Time of evaluation plus Delta, where Delta is a delay value given for the directive, e.g. 1 day.

Performance location expression (See Performance directive) An expression that will produce a set of valid location names.

Performance qualification expression (See Performance directive) An expression that will produce a single performance qualifier directive.

Performance authorization expression (See Performance directive) An expression that determines if the current user is authorized to perform the associated processing directive.

Procedure type Category of procedures. The performance of a procedure of a given type against a given case will produce a defined result for the case. To a procedure type is associated an authorization expression for the procedure.

Procedure type table A table of procedure type specifications which is stored in a node unit in connection to a location. The table contains specifications for the procedure types that may be executed at a location. These types include internal as well as external processes.

Processing directive Control data in the form of a specification of conditional processing that may be performed. A processing directive may comprise the following expressions specifying:

a directive description a performance location a performance qualification a performance mode a performance authorization a destination rule an associated case list
an action description
an action specification
a case sharing rule A processing directive is processed at one location, is atomic and is executed as a DWFM procedure. A given user is authorized to request execution of a given process directive if an authorization evaluation process operated on the performance authorization expression returns the value TRUE.

Processing history A set of information which records different aspects of the processing that has been performed on a given case. In one embodiment the processing history of a case is maintained by the user or applications through the assignment of appropriate values to variables through any of the Request Interfaces. This provides for the recording of performed directives and procedures, the resulting case state, the associated user, the location at which is was performed, the destination from which the case was selected, and the point in time when it was performed, etc. Further, the history may record the order in which directives/procedures were performed. Note that time stamps are approximations and cannot be relied upon to determine processing order. Typically, different locations have access to different clocks. This is stored in the case data and is possibly also sent to a coordinating node.

Processing table A table of processing directives, each uniquely named. A processing table is defined for a given case or case type. It specifies all processing directives that will be evaluated for possible execution on the case. A set of named processing tables is provided at a location. These tables specify location dependent processing directives that may be embedded into the processing table for a case.

Redundancy Same data is stored more than once in different memory areas. This cannot be totally eliminated but should be controlled and reduced.

Responsible destination A destination that is responsible for at least some aspects of case or a case type. For a given case, the responsible destination is responsible for ensuring that the case processing progresses in a correct way. For a given case type, the responsible destination is responsible for the correct specification and maintenance of case type information, and for ensuring that cases of the given type can successfully be processed according to the inventive method.

ROLLBACK A ROLLBACK operation signals unsuccessful end-of-transaction. It tells the transaction manager that something has gone wrong, and all of the updates by the logical unit of work so far must be "rolled back" or undone. C.f. COMMIT.

Session A DWFM procedure through which a given user is provided access to the functional components of the DWFM arrangement at a given location. Such an access may be direct, i.e. through a DWFM command, or indirect, i.e. through an application program that uses steps of the inventive method and the DWFM arrangement. Each session is associated with a session variable pool.

Table A table represents an unordered set of similar objects. A table is created and maintained by a user through the use of a DWFM request interface.

Transaction manager A system component that provides atomicity or semblance of atomicity in a transaction processing system.

Transaction A transaction is a logical unit of work that comprises at least one operation, and in general a sequence of several operations. For example, a transaction in a database may consist of a sequence of several database operations that transforms a consistent state of the database into another consistent state, without necessarily preserving consistency in all intermediate states.

Transaction processing A system that supports transaction processing guarantees that if a transaction executes some updates and then a failure occurs before the transaction reaches its normal termination, then those updates will be undone.

Uniquely named Uniquely named means that an object has a name which is different from other objects in a given set. The set may be the node units comprised in the distributed data processing system, or objects within a table or a list. Names are constructed by the DWFM arrangement or are defined by users according to the inventive method.

User table A table of user profiles which is stored at a location. The table contains profiles for users who normally are assigned to the location. It also contains information about those users that have established a session at the location and who normally have a different work location.

User Variable Pool See Variable Pool.

User A user is a uniquely named entity within the inventive method and the DWFM arrangement that corresponds to a person (a user), or a process acting as a user. Each user has a user profile, that specifies the user's name, work location, identification and authorization, and that contains a user variable pool.

User profile Each user has a user profile, that specifies the user's name, work location, identification and authorization, and that contains a user variable pool.

Variable pool A set of named variables, each having a specific value. A number of variable pools are defined, one for each location, session, user, case and procedure.

Each variable pool contains a number of DWFM variables with predefined named, and any number of user variables. A pool contains values for all possible variable names, i.e. the value Null for variables that have not explicitly been assigned a different value. The pools constitute a DWFM distributed database and are managed locally at each location in each node unit.

The contents of a variable pool may be maintained and accessed through a DWFM request interface.

A variable pool is either protected, i.e. changes are managed by a consistency interval mechanism, or is unprotected, i.e. changes are retained independent of a consistency interval. Further, a variable pool is either temporary, i.e. the content is discarded following the completion of the procedure using it, or permanent, i.e. its contents is retained indefinitely. A variable pool is also either private, i.e. it may only be accessed by a given procedure, or shared, i.e. it may be accessed by multiple procedures.

Well formed A well formed procedure operates on data in consistency maintaining manner.

Work location The location at which a certain user primarily performs his and can be contacted, i.e. at a node unit comprising e.g. a shared computer within a department, a personal workstation computer, or a process controlling computer within a factory.

Responsible Business Destination: A destination that is responsible for the business aspects of a case or a case type.

For a given case occurrence, this destination is responsible for the correct and timely processing of the case by users in the organization. This destination will be notified when action on cases of the given type have lapsed.

Responsible Plan Destination: For a given case type, this destination is responsible for the correct specification for the processing plan and for ensuring that the case processing progresses in a correct way. The destination will be notified when cases of the given type are un-determined.

Responsible Maintenance Destination: A destination that is responsible for the maintenance of the components involved in the processing of a case type.

For a given case type, this destination is responsible for the correct maintenance of procedures and code that are involved in the processing of cases of the given type. This destination will be notified when cases of the given type can not be successfully be processed by the DWF system.

Appendix B

1.0 DISTRIBUTED WORK FLOW MANAGER

This document describes further the different functions comprised in the distributed work flow management unit of the inventive arrangement.

1.1 DWF TABLES

These tables contain control information that governs the different DWFM processes at one DWFM location. A DWFM location is defined as one DBM server node and the workstations served by it through the LAN.

Note that some of the information in the tables, i.e., the information that is related to cases, also exists in the different case variable pools.

1.1.1 Location Table (DWFLOC)

This table stores information on locations that are known by the DWF location.

The table contains the following fields:

Location Identification contains the name of a location. This is a key field. (LOC_LocId A 20 *)
    *** COMMENT: This could be a standardized X.500-type name.
    END COMMENT ***

Location Description contains the description of the location. (LOC_Descr A 30)

This location contains TRUE if this record identifies THIS location; if the record defines a remote location, then the field contains FALSE. (LOC_This A 5)

Responsible User Identification The id of a user at the location that is responsible for the processing done at the location. This field exists only for THIS location. (LOC_RespUserID A 10)

Communication Info information to be used by THIS location when communicating with the location. This field is empty for THIS location. (LOC_CommInfo A 255)

1.1.2 Destination Table (DWFDEST)

This table stores information on destinations that are known by the DWF location.

The table contains the following fields:

Destination Code contains a destination code. This is a key field. (DST_Dest A 20 *)
    *** COMMENT: This could be a standardized X.500-type name.
    END COMMENT ***
    *** COMMENT: This may be a generic name to express "groupers".
    END COMMENT ***

Destination Description contains the description of the destination. (DST_Descr A 30)

Responsible User Identification The id of a user at this location that is responsible for the processing done on behalf of a destination. (DST_RespUserID A 10)

Location Identification contains a name of a DWF locations where the destination resides or where further information on the destination exists. This is a key field.

(DST_LocID A 20 *)
    *** COMMMENT: Location names could be standardized X.500-type names.
    END COMMENT ***

1.1.3 User Table (DWFUSER)

This table stores information on users that are known by the DWF location.

The table contains the following fields:

User Identification contains the unique identification of the user. This is a key field. (USR_UserID A 10 *)

Last Name contains the user's family name. (USR_LastName A 30)

First Name contains the user's given name. (USR_FirstName A 30)

Middle Initials contains the user's middle initials. (USR_MiddleInits A 10)

Local Organisation Code the locally used code of the users organisation.
    (USR_LocalOrg A 30)

Global Organisation Code the globally used code of the users organisation. (USR_GlobalOrg A 30)

1.1.4 User Destination Table (DWFUSRD)

This table stores information on the destination codes that users are authorized to process.

The table contains the following fields:

User Identification contains the identification of the user. This is a key field. (USD_UserID A 10 *)

Destination Code contains a destination code for which the user is authorized. This is a key field.
    (USD_Dest A 20 *)

1.1.5 User Processing Table (DWFUSRP)

This table stores information on the destination codes that users are responsible to process.

The table contains the following fields:

User Identification contains the identification of the user. This is a key field. (USP_UserID A 10 *)

Destination Code contains a destination code which the user is responsible to process. This is a key field.
    (USP_Dest A 20 *)

1.1.6 Task Table (DWFTASK)

This table stores information on Application Tasks that are known by the DWF location.

The table contains the following fields:

Task Identifier contains a task identifier. This is a key field. (TSK_TaskID A 10 *)

Task description contains the description of the task. (TSK_Descr A 30)

Task Type specifies if the task is related to a case or not. (TSK_Type A 30)

| CASE | if the task is case related. |
|---|---|
| NON_CASE | if the task is not case related. |

Program Type specifies the type of program to be executed to perform the task. (TSK_PgmType A 10)

Program Name contains information that allows the program to be invoked at this location. (TSK_PgmName A 64)

Execution Specifications contains parameter information required for the invocation of the program at this location. (TSK_ExecSpecs A 64)

1.1.7 User Task Table (DWFUSRT)

This table stores information on the tasks that users are authorized to perform.

The table contains the following fields:

User Identification contains the identification of the user. This is a key field. (UST_UserID A 10 *)

Task ID contains a task identification for which the user is authorized. This is a key field. (UST_TaskID A 10 *)

1.1.8 Case Type Table (DWFCAST)

This table stores information on case types that are known by the DWF location. This information is required in order to be able to create a case at the location.

The table contains the following fields:

Case Type contains the type. This is a key field.

(CTY_CaseType A 8 *)

Case Description contains the default description for the cases of this type. (CTY_Descr A 30)

Responsible Business Destination contains the default destination code that is responsible for the business aspects of cases of this type created at this location. (CTY_BusDest A 20)

Responsible Plan Destination contains the default destination code that is responsible for the processing plan of cases of this type created at this location.

(CTY_PlanDest A 20)

Responsible Maintenance Destination contains the default destination code that is responsible for the maintenance of case processing components of cases of this type created at this location. (CTY_MaintDest A 20)

1.1.9 Case Table (DWFCASE)

This table stores information on cases that are known by the DWF location. Such cases include:

locally held cases, i.e., the ones that are held at this location.

cases that are being transported to/from this location.

cases that are of interest to the location, e.g., a responsible destination resides at this location.

The table contains the following fields:

Case Identifier contains the identifier of the case. This name is unique within the DWF System—it is made up of the concatenation of creating location name and a unique value for that location. This is a key field.

(CAS_CaseID A 30 *)

Case Type contains the type of the case. (CAS_CaseType A 8)

Local Case Name contains the locally used name (alias) for the case. (CAS_LocalName A 30)

Global Case Name contains the globally used name (alias) for the case. (CAS_GlobalName A 30)

Case Description contains the description of the case. (CAS_Descr A 100)

Responsible Business Destination contains the destination code that is responsible for the business aspects of the case. (CAS_BusDest A 20)

Responsible Plan Destination contains the destination code that is responsible for the processing plan of the case. (CAS_PlanDest A 20)

Responsible Maintenance Destination contains the destination code that is responsible for the maintenance of case processing components. (CAS_MaintDest A 20)

Version Number version number. This is a monotonically increasing number. (CAS_Version A 9)

1.1.10 Action Table (DWFACT)

This table is used to notify users or DWF system components of work to be done at the DWF location. Each row in the table defines an action to be performed for a given case at the DWF location. The table contains the following fields:

Case Identifier contains the case identifier of the case. This is a key field. (ACT_CaseID A 30 *)

Task Type specifies the type of task to be performed. This is a key field. (ACT_TaskType A 10 *)

DIRECTIVE if the task is derived from a processing directive.

REEVAL if the task is a reevaluation of a processing directive.

LATE if this is a notification to a responsible user of a late action.

FAILED if this is a notification to a responsible user of a failure in the execution of a task or processing plan.

SYSTEM if the task is a system function.

NOTIFIC if the task is a user notification.

Task Identification identifies the task. Same value as in the Task Table. This is a key field.

(ACT_TaskID A 10 *)

Directive Identifier uniquely identifies a processing directive within the given case. This field exists if the Task Type is "DIRECTIVE" or "LATE". This is a key field.

(ACT_DirectiveID A 10 *)

Task Qualifier specifies the performance qualifier value for the processing directive within the given case. This field exists only if the Task Type is "DIRECTIVE". This is a key field. (ACT_Qual A 10 *)

CANNOT indicates that the task is derived from a processing directive for which the performance qualifier has the value "CANNOT".

NOT_YET indicates that the task is derived from a processing directive for which the performance qualifier has the value "NOT_YET".

MAY indicates that the task is derived from a processing directive for which the performance qualifier has the value "MAY".

SHOULD indicates that the task is derived from a processing directive for which the performance qualifier has the value "SHOULD".

*** COMMENT: Further values are envisioned to support other "delayed" actions such as case transportation and signalling to users when asynchronous events occur.

END COMMENT ***

Case Type contains the case type of the case.

(ACT_CaseType A 8)

Global Case Name contains the globally used name for the case. (ACT_GlobalName A 30)

Case Description contains the description of the case. This is the same description as for the case.

(ACT_CaseDescr A 100)

Action Description describes the action. If Task Type is "DIRECTIVE", then the description is produced by the processing directive that generated the action notification.

(ACT_ActionDeskr A 100)

Re-Evaluation Time time at which the Processing Plan for the case should be re-evaluated. (ACT_ReEvalTime A 14)

Early Start Time time at which DWF will begin prompting for action on this task. (ACT_EarlyStartTime A 14)

Late Finish Time time at which DWF will consider action on this task as overdue. (ACT_LateFinishTime A 14)

Task Information Miscellaneous information that will aid in the performance of the task. The information is produced by the processing directive that generated the action notification. (ACT_TaskInfo A 255)

*** COMMENT: This contains info to be passed to programs. The DWF system views this info as an envelope; the contents of the envelope is known only to the components that create it and the components that need to process it.

END COMMENT ***

The rows in this table are referred to by the rows in the DWFDACT table.

1.1.11 Destination Action Table (DWFDACT)

This table is used to notify users of work to be done at the DWF location. Each row in the table refers to a row in the DWFACT table and indicates an action to be performed for a given destination at the location. The table contains the following fields:

Destination Code A destination code which should be notified. This is a key field. (DAC_Dest A 20 *)

Case Identifier contains the case identifier of the case. This is a key field. (DAC_CaseID A 30 *)

Task Type specifies the type of task to be performed. This is a key field. (DAC TaskType A 10 *)

Task Identification identifies the task. This is a key field. (DAC_TaskID A 10 *)

Directive Identifier uniquely identifies a processing directive within the given case. This is a key field.
 (DAC_DirectiveID A 10 *)

Task Qualifier specifies the performance qualifier value for the processing directive within the given case. This is a key field. (DAC_Qual A 10 *)

1.1.12 Active Task Table

This table contains information on Application Tasks that are being executed within the DWF location and on the locally held cases that are requisitioned on behalf of them. The table contains the following fields:

Start Time time when this table entry was created. This is a key field. (ATX_StartTime A 14 *)

ATX Type defines the kind of ATX that is executing. This is a key field. (ATX_Type A 10 *)

| | |
|---|---|
| NC_USER | the ATX is not part of the processing plan for a case and it is performed by a given user. |
| NC_AUTO | the ATX is not part of the processing plan for a case and is not performed by a given user. |
| USER | the ATX performs a USER processing directive. |
| AUTO | the ATX performs an AUTOMATIC directive. |
| SYSTEM | the ATX performs a system function. |

Case Identifier contains the case identifier of a requisitioned case. If the ATX is not related to a case, this field is null. This is a key field.
 (ATX_CaseID A 30 *)

Directive Identifier identifies a processing directive within the given case if the ATX Type is "USER" or "AUTO", or a system function if the ATX Type is "SYSTEM". If the ATX is not related to a case, i.e., ATX Type is "NC_USER" or "NC_AUTO" then this value is undefined. This is a key field. (ATX_DirectiveID A 10 *)

Task Identification identifies the task. Same value as in the Task Table. This is a key field. (ATX_TaskID A 10 *)

Processing State contains the processing state value. This is a key field. (ATX_ProcState A 10 *)

PROCESSING signifies that the ATX process is active.

SUSPENDED signifies that the ATX process is suspended.

User Identification uniquely identifies the user that is performing the Application Task. This value is only present for ATX Type "NC USER" or "USER", else it is null. This is a key field. (ATX_UserID A 10 *)

Workstation Identification uniquely identifies the workstation at which the ATX is executing within the DWF loation. This value exists if Processing State is "PROCESSING", else it is null. This is a key field. (ATX_WSID A 10 *)

Process Identification uniquely identifies the ATX process within the workstation. This value exists if Processing State is "PROCESSING", else it is null. This is a key field.
 (ATX_ProcID A 10 *)
  *** COMMENT: This Process Id MUST be unique within the workstation, i.e., there should NEVER be an instance when an Active Task Table row exists where the combined values of Workstation Identification and Process Identification is the same as for an ATX which is newly started.
  END COMMENT ***

Case Type contains the case type of a requisitioned case. If the ATX is not related to a case, this field is null.
 (ATX_CaseType A 8)

Case Status specifies the status of the requisitioned case.
 (ATX CaseStatus A 10)

| | |
|---|---|
| CREATE | the case did not exist and the requisitioning is the result of an attempted creation of the case. |
| CHANGE | the case did exist and the requisitioning is the result of an attempted performance of a change to or termination of the case. |

If the ATX is not related to a case, this field is null.

1.1.13 Case History Table

This table is used to store the processing history of cases known to the DWF location. Each row in the table defines a task that has been performed for a given case. The table contains the following fields:

Case Identifier contains the case identifier of the case.
 (HIS_CaseID A 30)

Task Type specifies the type of task that was performed.
 (HIS_TaskType A 10)

DIRECTIVE the task was derived from a processing directive.

SYSTEM the task was a system function.

NOTIFICATION the task was a user notification.

Task Identification identifies the task. Same value as in the Task Table. (HIS_TaskID A 10)

Case Type contains the case type of the case.
 (HIS_CaseType A 8)

Global Case Name contains the globally used name for the case. (HIS_GlobalName A 30)

Case Description contains the description of the case.
 (HIS_CaseDescr A 30)

Task Description describes the task. (HIS_TaskDescr A 30)

Action Description describes the action.
 (HIS_ActionDescr A 30)

Directive Identifier uniquely identifies a processing directive within the given case. This field exists only if the Task Type is "DIRECTIVE". (HIS_DirectiveID A 10)

Task Qualifier specifies the reason for the performed task.
 (HIS_Qual A 10)

| | |
|---|---|
| MAY | indicates that the task was derived from a processing directive for which the performance qualifier had the value "MAY". |
| SHOULD | indicates that the task was derived from a processing directive for which the performance qualifier had the value "SHOULD". |

*** COMMENT: Further values may indicate other "delayed" actions such as case transportation and signalling to users when asynchronous events occur.

END COMMENT ***

Task Information Miscellaneous information that aided in the selection and performance of the task. (HIS_TaskInfo A 10)

Location Identification uniquely identifies the DWF location at which the task was executing. (HIS_Location A 20)

Workstation Identification uniquely identifies the workstation at which the task was executing within the DWF location. (HIS_WSID A 10)

User Identification uniquely identifies the user that performed the task. This value is only present for ATX Type "USER", else it is null. (HIS_UserID A 10)

Version Number a numeric value that represent the version that was committed by this task. (HIS_Version A 14)

Performance Start Time time at which DWF began the performance of this task. (HIS_StartTime A 14)

Performance Finish Time time at which DWF concluded the performance of this task. (HIS_FinishTime A 14)

Result indicates the result of the task execution. "COMMIT" indicates that a new case version was committed. "UNDO" indicates that the result was backed out. "FAILURE" indicates that an execution failure occurred. (HIS_Result A 10)

Reason indicates the reason for a failure. (HIS_Reason A 10)

1.2 DWF MANAGER FUNCTIONS

This section describes the different functions that are performed by the Distributed Work Flow Manager.

1.2.1 Periodic Functions

1. Clean-up of terminated ATXs and related cases

This entails the automatic release of requisitioned cases for which the associated Application Task has terminated.

The Active Task Table is used to determine the Case-Id of the cases that are requisitioned and the associated Application Task Execution Identifier (ATX-Id). If the ATX is marked as "PROCESSING", i.e., not "SUSPENDED", the IPC "QUERY" function determines if a given ATX_Id is still processing. If not, the ATX is assumed to have been terminated in which case the associated case is "synchronized" and released, i.e., the work files for the case (pools and other files) are "committed" or discarded in accordance with the committed value of the DBM case version number (see DEACTIVATE_CASE). Thereafter, the associated row in the Active Task Table is removed.

This function is performed daily and is tied to the initialization of the associated DBM server functionality.

2. Re-evaluation of case processing plans

This entails the re-evaluation of the processing plans for cases with performance qualifications that have yielded a distinct Re-Evaluation Time value. Such directives and cases are given by the associated entries in the Case Action Table. The evaluation of case processing plans is described below.

This function is performed daily and is tied to the initialization of the associated DBM server functionality.

1.2.2 Functions Tied to System Events

1. Evaluation of case processing plan

When a new version of a case (created or changed) has been committed following an Application Task Execution (ATX), when a case has been received from another DWF location, or when the re-evaluation time has arrived, all processing directives for the given case are evaluated.

First, the given case is requisitioned for this SYSTEM process and the associated committed case pool is opened for READ_ONLY access. Thereafter, all entries in the Case Action Table for the given case are removed and all processing directives are evaluated. If the evaluation yields a qualifier value of "CANNOT" and the Re-Evaluation Time is distinct or if the qualifier is "NOT_YET", "SHOULD" or "MAY", then an appropriate row is added to the Case Action Table. When the process is finished, the case pool is closed and the case is released.

For the directives yielding "SHOULD" or "MAY", the Task Information portion of the row in the Case Action Table is be provided by evaluating the Action Description expression.

*** COMMENT: The results of this processing should be stored in the case control pool. Thereafter should the notifications be constructed and packaged into one pool (similar to a case control pool) per remote location and sent to that location. Then should the local notifications be inserted in the local DBM.

END COMMENT ***

1.3 VARIABLE POOL USAGE

The following variable pools are used:

| | |
|---|---|
| location | This pool contains any location specific programs and other stuff (location name, etc.) for a given DWF location (LAN). It is opened READ_ONLY PRIVATE by all DWF processes that need access to it. |
| user | This pool contains any user specific programs and other stuff (user name, profiles, list positioning, selection criteria, etc.) for a given DWF user. It is opened SHARED UPDATE by all DWF processes at the workstation where the user is currently working. It is served by the Workstation Shared Pool Server; this process is established when a DWF user signs-on at the workstation. The pool is a working copy of the latest committed user pool; the DWF sign-on/sign-off process manages the "commitment" of the user pool. |
| session | This pool contains any information specific to a DWF session. It is opened SHARED UPDATE by all DWF processes at the workstation where the session is currently executing. It is served by the Workstation Shared Pool Server; this process is established when a DWF user signs-on at the workstation. The pool is discarded when the session terminates. |
| task | This pool contains any information specific to a DWF ATX task. It is created and opened PRIVATE UPDATE by the ATX shell. The pool is discarded when the ATX terminates. |
| case control | This pool contains any case specific programs and other stuff (case ids, processing plan, etc.) for a given DWF case. If it needed for processing plan evaluation or other changes, then it is opened PRIVATE UPDATE by the DWF process at the workstation that currently has REQUISITIONed and ACTIVATEd the case. The pool is a working copy of the latest committed case control pool; the ATX process and the ACTIVATE and DEACTIVATE API functions manage the case control pool. |
| case data | This pool contains the case specific application data for a given DWF case. If it is needed for a ATX execution, then it is opened PRIVATE UPDATE by the DWF process at the workstation that currently has REQUISITIONed and ACTIVATEd the case. The pool is a working copy of the latest committed case data pool; the ATX process and the ACTIVATE and DEACTIVATE API functions manage the case data pool. |

1.4 DESIGN OF API FUNCTIONS

1.5 START ATX

This function starts and establishes communication with an ATX shell.

When an ATX is started, it registers itself in the Active Task Table. If it is related to a case, then this case is REQUISITIONED (in-line) and the resulting Active Task Table row contains information on the case. Thereafter, the DBM changes are committed and control is given to the appropriate Application Task.

1.6 ACTIVATE ATX

This function register an ATX task as active and executes as part of the ATX shell.

It uses an in-line call to REQUISITION_CASE to register itself in the Active Task Table.

1.6.1 logic

1. Establish addressability to the DBM and other necessary resources.
2. Create a Task Pool and initialize with necessary data.

1.7 REQUISITION CASE

This function requests a given case, existing or non-existing, to be made available and reserved for EXCLUSIVE use by the requester at the current location, i.e., the location of the requester.

The REGISTER_CASE function is used to perform the actual registration of the requisitioned case.

The request will fail if a session is not established or if the case is already reserved at this location.

Some implementation notes:

1. REQUISITION_CASE is called with a parameter to indicate if the requisition is for a CREATEd case or for CHANGE of an existing one.

If the function is CREATE, then this function reserves a new unique Case Identification value (in the Case Type Table).

If the function is CHANGE, then this function performs a case pool "synchronization", i.e., it uses the Case Version Number stored in the DBM Case Table to ensure that the appropriate one of the committed and back-level pools is made the latest committed one.

2. REQUSITION_CASE is called with a parameter that allows it to work as part of the callers recovery scope, or as a separate recovery scope. This is to ensure that we don't encounter any long term DBM locks.

In the first instance, the function should assume that the current process has opened the appropriate DBM database(s) and that any DBM changes made can be committed, i.e., the function can make the necessary DBM calls and changes, COMMIT the result and return to the caller. This mode of operation is used for the implicit REQUISITIONing of the case for an ATX that performs part of a case processing plan.

In the second instance, the function should assume that the current process has performed DBM changes that can not be committed. The function must therefore spin off a separate recovery scope (process) that opens the DBM database(s), makes the necessary DBM calls, COMMITs the result, closes the database(s), communicates the result back to the caller and terminates. In the meantime, the callers process is waiting for the REQUISITION to complete, and, if no response has been received within a time-out period, the calling process should assume that the call has failed. This mode of operation is used for the explicit REQUISITIONing of other, "related" cases and when creating a case.

1.7.1 logic

1. If called for SAME recovery scope then issue a call to REGISTER_CASE else start REGISTER_CASE as a separate, related process.
2. If REGISTER_CASE failed then return appropriate return code.
3. If called for CREATE then create a new committed case pool using the Case Type Table information.
4. If called for CHANGE then use Case Version from the Case Table to synchronize the case pools, i.e., either the latest committed pool and associated document files establish the latest committed version or so do the backup pool and document files.
5. Return appropriate return code.

1.8. REGISTER CASE

This function performs the registration of a case and the commit of DBM changes in as "inline" logic or as a separate process. It is called by the REQUISITION_CASE function.

1.8.1 logic

1. If called as a SEPARATE recovery scope then establish addressability to DBM and other needed resources.
2. If the call is for CREATE then reserve a unique case id using the Case Type Table.
3. Verify in Active Task Table that the requested case, if any, is available.
4. If so, insert a row in the Active Task Table that represents this ATX and case, if any.
5. If called as a SEPARATE recovery scope then COMMIT DBM processing and disconnect from other resources.
6. Return appropriate return code.

1.9 ACTIVATE CASE

This function requests activation of access to a given newly created or existing case that has been successfully requisitioned by the requester.

The request will fail if a session is not established, if the given case is not successfully requisitioned by the requester or if the case does not exist.

Some implementation notes:

1. The ACTIVATE_CASE function establishes the case working directory, creates the working copy of the case pools and other related files and opens the case working pools as required.

*** COMMENT: Note that we may choose to selectively open these related files since it may be an unnecessary overhead to always open them all.

END COMMENT ***

1.9.1 Logic

1. Ensure that the case is requisitioned.

*** IMPLEMENTATION NOTE: Use the task pool for this.

REQUISITION_CASE registers successful reqs there.

END IMPLEMENTATION NOTE ***

2. Create a working directory.
3. Create a work copy of the case pools and mark as SAME in the task pool.
4. Open the case data pool using the passed Pool Id. Register the open case data pool in the task pool.
5. Create a work copy of needed registered document files and mark as SAME in the task pool.

*** QUESTION: How do we know what document files that the task needs? Should we do this by explicit request during the execution of the ATX?

END COMMENT ***

1.10 CREATE CASE

This function requests the creation of a given non-existing case that has been successfully requisitioned by the requester.

Following the successful completion of the request, the created case will exist.

The request will fail if a session is not established, if the given case is not successfully requisitioned or if the case already exists.

Some implementation notes:

1. The CREATE_CASE explicitly identifies the case type and local and global identifiers of the case to be created.
2. In order to work with the case an ACTIVATE_CASE call must be issued.
3. The function may be performed at any time within an ATX.

1.10.1Logic

1. Issue a REQUISITION_CASE to ensure that the case is available. This will reserve a new unique case id.

2. Create a working directory.

3. Create a work copy of the case control and data pools and mark as CREATED in the task pool.

1.11 TERMINATE CASE

Requests the termination of a given existing case that has been successfully requisitioned by the requester.

Following the successful completion of the request, the given case will cease to exist.

The request will fail if a session is not established, if the given case is not successfully requisitioned or if the case does not exist.

Some implementation notes:

1. The TERMINATE_CASE implicitly refers to the case to which the ATX is related, i.e., it can ONLY be performed by an ATX that is part of the case plan. It signals that the current case should be deleted following the termination of the ATX.

1.12 REGISTER FILE

This function registers an associated file as created, changed or deleted for a given case. An associated file is part of the case envelope.

1.13 DEACTIVATE CASE

This function requests that access to the current case be deactivated, and that changes made to case data (profile and envelope) be either RECORDed (for possible later commitment), or DISCARDed.

The request will fail if a session is not established or if a current case is not established.

Some implementation notes:

1. The DEACTIVATE_CASE is performed by the ATX when the Application Task has terminated.

If the case has been created or changed, then the function stores the new case version number in the case working control and data pools and closes them. It "commits" the new case pools and new/changed files by making the current committed version a back-level version and establishing the working version as the latest committed one. Thereafter, it updates the related row in the Case Table with the new case version number; in the case of a newly CREATEd case, a new row is added to the Case Table.

If the current case is marked for deletion (see TERMINATE_CASE above), then the Case Table row is removed. Thereafter, the committed version of the case pools, files and directory are removed.

*** COMMENT: Note that we later may have to "undo" this commit. This happens if later there occurs an unrecoverable error or if the ATX aborts. The ATX table entry or entries contain sufficient information to be able to do this back-out properly.

END COMMENT ***

1.13.1 Logic

1. If the deactivation is for COMMIT, update the version number in the case pool.

2. Close the case pool using the information in the task pool.

3. If the deactivation is for ABORT then delete the work copies of the pool and document files.

4. If the deactivation is for COMMIT then
   a. make a copy of the back-level pool and files, if any.
   b. make the latest committed pool and files back-level.
   c. make the current work copies of the pool and files the latest committed ones.
   d. if there is any failure, the initiate ATX back-out.

5. If the case was CREATED then insert a row in the Case Table.

6. If the case was CHANGEd then update the version number in the Case Table.

If there is a failure, then ATX back-out processing must be performed.

1.14 RELEASE CASE

This function requests that a given case, reserved by the requester, be released for use by other requesters.

Following the request, the given case will no longer be available for processing by the requester, but may be re-requisitioned.

The request will fail if a session is not established or if the case is not requisitioned.

Some implementation notes:

1. The RELEASE_CASE removes the associated row in the Active Task Table and is performed by the ATX when the Application Task has terminated.

2. The function also performs re-evaluation of the case.

1.15 DEACTIVATE TASK

This function executes as part of an ATX shell and requests that the current ATX be dismantled and that changes be recorded (COMMIT) or discarded (BACK_OUT, ABORT)

The request will fail if a session is not established or if an ATX is not established.

Note that any calls except for the highest level ATX should be ignored.

Some implementation notes:

1. After the ATX has DEACTIVATEd and RELEASEd all REQUISITIONed and ACTIVATEd cases, it commits all DBM changes made within the recovery scope, i.e., the ones made by the Application Task, by API functions or by the APX itself.

Note that, if one or more cases were CREATED by the terminating ATX, there may be more cases that must be DEACTIVATEd accordingly.

The Active Task Table is used to determine all cases that were requisitioned by the terminating ATX.

1.15.1 Logic

1. Use the Active Task Table to DEACTIVATE_CASE and RELEASE_CASE for all active cases.

2. COMMIT the DBM processing for the task.

3. Close and discard the Task Pool.

4. Disconnect from the DBM and other resources.

1.16 EVALUATE DIRECTIVES

This function performs a complete re-evaluation of the processing directives for a given case and the generation of resulting notifications.

1.17 EXECUTE JOB MANAGER

This function invokes the DWF Job Manager function.

It requests the user to sign-on, establishes a session and aids the user in selecting work to be done.

It initiates ATX execution and monitors their processing and termination.

The DWF Job Manager User Interface provides at least the following standard functions:

Sign-on and password registration and change.

Creation of a new case of given type.

Opening a case:
  via Action Notification list
  via Case List
  via explicit Case name Show:
  late Actions
  Action Notification list
  Action Notification summary
  Case list
  Case information Perform:
  selection of Action Notifications
  specification of Action groups
  specification of Destination groups update of Action Notification list
reevaluation of pending Cases
pending actions (AUTOMATIC or IMMEDIATE)
Utilities:
  import Case
  export Case
  import Case Type
  export Case Type
Maintenance of:
  Users
  Performance Responsibility
  Authorization
  Destinations
  Locations
  Operation Types
  Cases
  Case Types
  translation of Destinations
  Reconstruction
Termination

I claim:

1. Method for distributed work flow management in a distributed data processing system comprising node units (10) connected in a network (12,16), whereby data can be communicated between node units (10), each node unit (10) comprising data processing means, data storage means, data presentation means and data communication means, wherein a case associated with case specific application data including digititized documents is initiated, processed in a case handling process in a node unit (10) and possibly transferred between node units (10) according to case specific control data, the method being characterized in the steps of:

defining at least one location in at least one node unit (10) within a distributed work flow management arrangement, said location being a uniquely named entity where processing of a case is executed and being able to communicate with another location;

forming a case from a case envelope for containing the application data and a case profile for containing control data in the form of processing directives, that specify the processes and operations a case will go through and including a processing plan that specifies the sequence of said operations, said control data being able to generate control signals that affects a component of the distributed data processing system, said case in its entirety being transportable between node units;

specifying in the processing directives the user who should process the processing directive, the time at which it can be processed or must be processed and in what location or node unit the processing can be performed, the processing directives being independent or related in terms of their processing; and transporting said case to the correct user via the data communications means and prompting appropriate action in a timely fashion dependent on the processing directives of the control data, the control data, the application data and control data for said case thus being contained in and transported with the case.

2. Method according to claim 1, characterized in step of providing case handling functions that define an application architecture for developing operational application programs and a common standard for inter-application communication.

3. Method according to claim 1, characterized in that application data and control data is stored within the case and transferred with the case in the data format of the data processing means that has been used to create and/or manipulate said application data.

4. Method according to claim 1, characterized in the step of including in the application data of a case an original document that may be handled by only one user at a time, and possibly a set of identical or similar documents, defining each document copy for a specific use in the case handling process, whereby a case having such identical or similar documents is divisible into subcases.

5. Method according to claim 1, characterized in the steps of:

dividing an original case into a first subcase and a second subcase, each subcase comprising a non-overlapping part of the application data and/or control data or a copy of all application data and/or control data of said case, processing said first and second subcases in a sequence or in parallel, and possibly merging the first and the second subcases into a single case.

6. Method according to claim 5, characterized in the steps of relating said subcases buy specifying in the processing plan of each subcase a coordination such that the subcases cooperate and remain parts of the original case and processing each subcase as a basic case unit.

7. Method according claim 1, characterized in the step of storing data needed to manage the flow of a case between users and locations in specifically named variables which are kept separated from application programs.

8. Method according to claim 1, characterized in the steps of storing application data necessary to process a case in a variable pool comprising a set of named variables each having a specific value by means and associating the variable pool to a case envelope belonging to said case.

9. Method according to claim 1, characterized in the step of storing information associated with a document, said associated information having for example the nature of a form, a note or a margin scribble.

10. Method according to claim 1, characterized in the step of managing data consistency of a first case in the node unit in which said case is currently processed, and if said first case is a first subcase related to a second subcase, maintaining data consistency in each subcase independently of the other subcase, and if said first and second subcases are merged into a second case, achieving data consistency within said second case through collection and processing of application data from the first and the second subcases and by means of the control data comprised in each subcase is used to determine the validity of changes in application data.

11. Method according to claim 1, characterized in structuring locations in a hierarchical manner so that a first location may be coordinating location for at least one second location, storing, in a coordinating location, information about a case which is located in a coordinated location, whereby a case may be requested from coordinated locations by a coordinating location, found and transported from any first location to any second location in the hierarchy;

transferring regularly said information about a case being currently processed in a coordinated location to its coordinating location, thereby keeping track of said case.

12. Method according to claim 1, characterized in the steps of:

requisitioning a case;

if the case is not residing in a current first location, then initiating a case transport request including transmitting messages to other locations in order to attempt to transport the case to said first location;

evaluating a usage requirement of a case against the current usage for said case, thereby detecting a possible usage conflict;

marking a case which is present in said current first location and available as requisitioned, thereby reserving said case for use by the requester.

13. Method according to claim 1, characterized in the step of releasing a case no longer required for processing by marking it as released and thereby making said case available for processing by other users.

14. Method according to claim 1, characterized in the step of creating a new case by generating an un-committed copy an empty case variable pool and an envelope from a case type profile and envelope information.

15. Arrangement for distributed work flow management in a distributed data processing system comprising node units (18,20,22) connected in a network (12), whereby data is communicated between node units (18,20,22), each node unit (18,20,22) comprising data processing means, data storing means, data presentation means and data communication means, characterized in that the system comprises coordinating means and a node unit (18,20,22) having a user interface unit (24), an information presentation manager (26), a distributed work flow management unit (28), a database manager (40), an application/external component unit (30), an authorization manager (32), a data transport manager (34) and a data communications means 38, wherein the user interface unit (24) comprising different user interfaces is functionally interconnected with the information presentation manager (26), the database manager (40), the distributed work flow management unit (28) and the application/external component unit (30) so that data and control signals are transferable between a user and the units interconnected with the user interface unit, the information presentation manager (26) is functionally interconnected with the database manager (40) and with the distributed work flow management unit (28), whereby said information presentation manager (26) is arranged to present visual and/or audible and/or digitally represented data to a user, the distributed work flow management unit (28) is functionally interconnected with the authorization manager (32), the data transport manager (34), the interprocess communication manager (36) and the application/external component unit (30), whereby said distributed work flow management unit (28) is arranged to initiate a case and to, in dependence of control data comprised in said case, control storage of case data, control processing of said case, control presentation of case data by means of the information presentation manager (26), control access to data by means of the authorization manager (32), control data transport by means of the data transport manager (34), control communication between processes operating on said case by means of the interprocess communication manager (36), and control the initiation and termination of application functions or other external functions comprised in the application/external component unit (30), the data base manager (40) is interconnected with the data transported manager (34), and in that the data communication means is interconnected with the data transport manager (34) and the interprocess communication manager.

16. Arrangement according to claim 15, characterized in request interface means included in a node unit for requesting services from different components of the arrangement during the execution of a procedure, said procedure comprising the performance of a processing directive or an external process.

17. Arrangement according to claim 16, characterized in that the request interface means comprises user command interface means for requesting services through entering commands from input means such as a terminal keyboard.

18. Arrangement according to claim 16, characterized in that the request interface means comprises processing directive interface means for specifying processing directives.

19. Arrangement according to claim 16, characterized in that the request interface means comprises application programming interface means for requesting services by application programs.

20. Arrangement according to claim 15, characterized in locking means for reservation of an exclusive set of data for a limited period and for ensuring the avoidance of dead-lock conditions.

21. A method for distributed work flow management in a distributed data processing system, said distributed data processing system comprising a plurality of node units connected to one another in a computer network, each node unit comprising data processing means, data storage means, data presentation means and data communication means whereby data is transferred between said node units, wherein a case associated with case-specific application data including a digitized document is initiated, processed in a case handling process within a node unit, and is transferable between node units according to case-specific control data, the method comprising the steps of:

defining at least one location in at least one node unit within a distributed work flow management arrangement, said at least one location being a uniquely named entity where processing of a case is executable, said at least one location arranged to communicate with another location;

forming said case from a case envelope for containing the application data and a case profile for containing control data in the form of processing directives, said processing directives specifying the processes and operations a case will go through and including a processing plan that specifies the sequence of said operations, said control data arranged to generate control signals that affect a component of the distributed data processing system, thus in every case comprising application data, control data and the whole processing plan for the case, said case in its entirety being transportable between node units;

specifying in the processing directives a destination that should process the processing directive, the time at which said processing directive is to be processed and in what location or node unit the destination is located, the processing directives being independent or related in terms of their processing; and transporting said case to the correct location corresponding to said destination, via the data communication means and at that location prompting appropriate action to users who are responsible for said destination in a timely fashion dependent on the processing directives of the control data and on an authorization specification of the users at said destination, the application data and the control data thus being contained in and transported with the case.

* * * * *